(12) United States Patent
Bardman et al.

(10) Patent No.: US 7,691,942 B2
(45) Date of Patent: *Apr. 6, 2010

(54) AQUEOUS DISPERSION OF POLYMERIC PARTICLES

(75) Inventors: James Keith Bardman, Green Lane, PA (US); Robert Mitchell Blankenship, Harleysville, PA (US); John Michael Friel, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/507,341

(22) Filed: Aug. 21, 2006

(65) Prior Publication Data

US 2007/0043159 A1  Feb. 22, 2007

Related U.S. Application Data

(60) Provisional application No. 60/709,664, filed on Aug. 19, 2005.

(51) Int. Cl.
| | | |
|---|---|---|
| C08F 2/22 | (2006.01) | |
| C08F 2/16 | (2006.01) | |
| C08L 35/02 | (2006.01) | |
| C08L 33/12 | (2006.01) | |
| C08L 33/10 | (2006.01) | |
| C08L 33/08 | (2006.01) | |
| C08L 31/02 | (2006.01) | |

(52) U.S. Cl. .................. 524/804; 524/832; 524/800
(58) Field of Classification Search ................ 524/800, 524/804, 458, 457
See application file for complete search history.

(56) References Cited

U.S. PATENT DOCUMENTS

| | | | |
|---|---|---|---|
| 4,427,836 A * | 1/1984 | Kowalski et al. ............ 525/301 |
| 4,456,726 A | 6/1984 | Siol et al. | |
| 4,469,825 A | 9/1984 | Kowalski et al. | |
| 4,539,361 A | 9/1985 | Siol et al. | |
| 4,594,363 A | 6/1986 | Blankenship et al. | |
| 4,677,003 A | 6/1987 | Redlich et al. | |
| 4,880,842 A | 11/1989 | Kowalski et al. | |
| 4,970,241 A | 11/1990 | Kowalski et al. | |
| 4,985,064 A | 1/1991 | Redlich et al. | |
| 5,036,109 A | 7/1991 | Chip et al. | |
| 5,157,084 A | 10/1992 | Lee et al. | |
| 5,216,044 A | 6/1993 | Hoshino et al. | |
| 5,225,279 A | 7/1993 | Relich et al. | |
| 5,340,858 A | 8/1994 | Bauer et al. | |
| 5,350,787 A | 9/1994 | Aydin et al. | |
| 5,352,720 A | 10/1994 | Aydin et al. | |
| 5,494,971 A | 2/1996 | Blankenship | |
| 5,510,422 A | 4/1996 | Blankenship et al. | |
| 5,527,613 A | 6/1996 | Blankenship et al. | |
| 5,545,695 A | 8/1996 | Blankenship | |
| 5,618,888 A * | 4/1997 | Choi et al. .................. 525/301 |
| 5,639,805 A * | 6/1997 | Park et al. .................. 523/201 |
| 5,989,630 A | 11/1999 | Schlarb et al. | |
| 6,020,435 A | 2/2000 | Blankenship et al. | |
| 6,139,961 A * | 10/2000 | Blankenship et al. ....... 428/402 |
| 6,252,004 B1 | 6/2001 | Blankenship et al. | |
| 6,632,531 B2 | 10/2003 | Blankenship | |
| 6,673,451 B2 * | 1/2004 | Bardman et al. ....... 428/402.22 |
| 6,784,262 B2 | 8/2004 | Blankenship | |
| 2001/0009929 A1 | 7/2001 | Blankenship et al. | |
| 2001/0036990 A1 | 11/2001 | Bobsein et al. | |
| 2003/0129435 A1 | 7/2003 | Blankenship et al. | |

* cited by examiner

*Primary Examiner*—Vasu Jagannathan
*Assistant Examiner*—Karuna P Reddy
(74) *Attorney, Agent, or Firm*—Cantor Colburn LLP

(57) ABSTRACT

An aqueous dispersion of polymeric particles and process for forming thereof is provided. The particles comprise a first polymer comprising, when dry, at least one void; and, substantially encapsulating the first polymer, at least one second polymer comprising, as polymerized units, at least one ethylenically unsaturated monomer.

11 Claims, No Drawings

AQUEOUS DISPERSION OF POLYMERIC PARTICLES

This non-provisional patent application is claiming priority based on Non-Provisional Patent Application No. 60/709,664, filed Aug. 19, 2005, the disclosure of which is incorporated herein by reference.

This invention relates to film-forming binders that can be used in aqueous coating compositions. More particularly, this invention relates to an aqueous dispersion of film-forming polymeric particles that also provide a high degree of white light scattering when the film dries.

Aqueous coating compositions that, when dried, have improved film integrity (e.g., scrub resistance) are desired, particularly in coating compositions having low or no volatile organic compounds ("VOC") content. In some cases, particles having one or more voids provide such coating compositions, while concurrently reducing the mass of the particles, and thereby reducing the materials and energy which would have been expended in providing that mass. Particles, including one or more voids may also contribute to the opacity of dry coating films.

U.S. Pat. No. 6,139,961 discloses an aqueous dispersion of water-insoluble core/sheath polymer particles. The core contains a void encapsulated by a first shell polymer having a glass transition temperature greater than 50° C., and polymerized on the first shell is a second shell polymer having a glass transition temperature of −15° C. to −50° C. However, to the extent that such particles can form a film, we have discovered that they have poor opacity, probably because many of the voids collapse upon film formation.

The film-forming binder particles of this invention provide superior opacity characteristics i.e., improved and consistent hiding, in comparison to the prior art, when incorporated into coatings. A first aspect of the invention is an aqueous dispersion comprising polymeric particles. The particles comprise from 10 to 80% by weight, based on total polymeric weight of the particle when dry, of a first polymer, and at least one second polymer comprising, as polymerized units, at least one ethylenically unsaturated monomer. The first polymer comprises, when dry, at least one void having a diameter of from 100 to 1200 nm and the second polymer substantially encapsulates the first polymer and has a Tg of from −60° C. to 50° C. The aqueous dispersion has a BCOP hiding factor of at least 0.1.

A second aspect of the invention is a process for forming an aqueous dispersion of polymeric particles comprising providing an aqueous dispersion of multi-stage emulsion polymer comprising a core stage polymer and a first shell stage polymer; forming a second shell stage polymer substantially encapsulating the first shell stage polymer by adding to the aqueous dispersion at least one mono-ethylenically unsaturated monomer and causing at least 10% of the mono-ethylenically unsaturated monomer to polymerize, at a temperature of from 5° C. to 65° C., in a presence of the multi-staged polymer; and adding a swelling agent to the aqueous dispersion prior to, during, or after the polymerization of the mono-ethylenically unsaturated monomers of the second shell stage polymer.

In this process, the core stage polymer comprises, as polymerized units, from 5 to 100 percent by weight, based on a weight of the core stage polymer, of hydrophilic mono-ethylenically unsaturated monomer, and from 0 to 95 percent by weight, based on the weight of the core stage polymer, of at least one nonionic mono-ethylenically unsaturated monomer. The first shell stage polymer has a calculated Tg of at least 50° C. and comprises, as polymerized units, at least 50 percent by weight of nonionic mono-ethylenically unsaturated monomer. The polymerization temperature is at least 30° C. lower than the calculated Tg of the first shell stage polymer.

The first polymer may be a condensation polymer, for example, a polyester. The first polymer may include at least one copolymerized mono-ethylenically unsaturated monomer and may be formed by a free radical addition polymerization process Suitable mono-ethylenically unsaturated monomers include, for example, (meth)acrylic ester monomers including, for example, (meth)acrylic ester monomers, including methyl acrylate, ethyl acrylate, butyl acrylate, 2-ethylhexyl acrylate, decyl acrylate, lauryl acrylate, methyl methacrylate, butyl methacrylate, ethyl methacrylate, isodecyl methacrylate, lauryl methacrylate, hydroxyethyl methacrylate, hydroxypropyl methacrylate; (meth)acrylonitrile, and (meth)acrylamide; acetoacetoxyethyl(meth)acrylate; acetoacetoxypropyl(meth)acrylate; 2-(3-oxazolidinyl)ethyl(meth)acrylate, tert-butylaminoethyl(meth)acrylate; ethyleneureido-functional monomers; allyl acetoacetate; ethylene; propylene; styrene and substituted styrenes; butadiene; vinyl acetate, vinyl butyrate and other vinyl esters; vinyl monomers, such as vinyl chloride, vinyl toluene, and vinyl benzophenone; and vinylidene chloride. Preferred first polymers and second polymers, independently, are all -(meth)acrylic, predominantly (meth)acrylic, styrene/(meth)acrylic, and vinyl acetate/acrylic, i.e., the polymer composition includes those monomers or classes of monomers. The use of the term "(meth)" followed by another term such as acrylate or acrylamide, as used throughout the disclosure, refers to both acrylates or acrylamides and methacrylates or methacrylamides, respectively.

Each of the first polymer and the second polymer, independently, may contain from 0% to 7.5%, and preferably from 0% to 2.5%, by weight of a copolymerized monoethylenically-unsaturated acid monomer, based on the weight of the polymer, such as, for example, acrylic acid; methacrylic acid; crotonic acid; itaconic acid; fumaric acid; maleic acid; monomethyl itaconate; monomethyl fumarate; monobutyl fumarate; maleic anhydride; 2-acrylamido-2-methylpropane sulfonic acid; vinyl sulfonic acid; styrene sulfonic acid; 1-allyloxy-2-hydroxypropane sulfonic acid; alkyl allyl sulfosuccinic acid; sulfoethyl (meth)acrylate; phosphoalkyl(meth)acrylates, such as phosphoethyl(meth)acrylate, phosphopropyl(meth)acrylate, and phosphobutyl(meth)acrylate; phosphoalkyl crotonate, phosphoalkyl maleate; phosphoalkyl fumarate; phosphodialkyl(meth)acrylate; phosphodialkyl crotonate; and allyl phosphate. In some embodiments, both an acid monomer and an amide monomer are incorporated into the second polymer, such as, for example, from 0.1 to 2.5 weight % itaconic acid and from 0.1 to 2.5% by weight acrylamide, each based on the weight of the polymer.

Multi-ethylenically unsaturated monomers are herein defined as monomers bearing two or more ethylenically unsaturated bonds, such as, for example, allyl methacrylate, diallyl phthalate, 1,4-butyleneglycol dimethacrylate, 1,2-ethyleneglycol dimethacrylate, 1,6-hexanediol diacrylate, and divinyl benzene. Levels of such monomers must be selected, particularly for the second polymer, such that film formation is not materially compromised. In some embodiments, the first polymer comprises from 0.05 to 50%, preferably 0.2 to 35%, more preferably 0.5 to 30%, yet more preferably 1 to 25%, by weight, based on dry polymer weight, of copolymerized multi-ethylenically unsaturated monomers. In other embodiments, the first polymer contains from 0.05% to 5%, by weight based on dry polymer weight, copolymerized multi-ethylenically unsaturated monomers.

The glass transition temperature ("Tg") of the first polymer is, preferably, greater than 50° C., more preferably, greater than 75° C., and most preferably, greater 90° C. The Tg of the second polymer is from −60° C. to 50° C., preferably −60° C. to 35° C., and more preferably from −20° C. to 20° C. In each instance, the Tg is calculated by using the Fox equation (T. G. Fox, Bull. Am. Physics Soc., Volume 1, Issue No. 3, page 123(1956)). For copolymers comprising more than two different monomer types, the calculation may be expressed as:

$$1/Tg = \Sigma[w(Mi)/Tg,(Mi)],$$

where w(Mi) is the weight fraction of each monomer, and Tg,(Mi) the glass transition temperature of the homopolymer of Mi. For example, for calculating the Tg of a copolymer of monomers M1 and M2, 1/Tg(calc.)=w(M1)/Tg(M1)+w(M2)/Tg(M2), wherein Tg(calc.) is the glass transition temperature calculated for the copolymer;

w(M1) is the weight fraction of monomer M1 in the copolymer;

w(M2) is the weight fraction of monomer M2 in the copolymer;

Tg(M1) is the glass transition temperature of the homopolymer of M1; and

Tg(M2) is the glass transition temperature of the homopolymer of M2, where all temperatures are in Kelvin (K).

The glass transition temperatures of homopolymers may be found in "Polymer Handbook," 4$^{th}$ edition edited by J. Brandrup, E. H. Immergut, and E. A. Grulke, Wiley-Interscience Publishers (1999).

The aqueous dispersion of polymeric particles of the present invention is typically formed by an emulsion polymerization process. The first polymer and the second polymer are preferably formed by a multistage polymerization process wherein the second polymer is formed in the presence of the first polymer. In certain embodiments, the first polymer can itself include multiple polymers that may be formed in multiple stages. There may be two or more phases included in the second polymer, as long as each of the phases includes at least one copolymerized mono-ethylenically unsaturated monomer and each has a Tg of from −60° C. to 50° C.

In some embodiments, at least 10, preferably 20, more preferably 50, and most preferably 100, weight % of the total of the second polymer is formed by polymerization at a temperature of from 5° C. to 65° C., preferably 10° C. to 50° C., more preferably 20° C. to 40° C., wherein the polymerization temperature is at least 30° C. lower than the Tg of the first polymer. Preferably, at least the first 10%, more preferably, at least 20%, or most preferably, at least 50% of the second polymer is formed by polymerization at a temperature of from 5° C. to 65° C., preferably 10° C. to 50° C., and more preferably 20° C. to 40° C., wherein the polymerization temperature is at least 30° C. lower than the Tg of the first polymer. The temperature at which the second polymer is formed may be allowed to rise above 65° C. during the formation of the second polymer with the proviso that at least 10% of the second polymer is formed at a temperature of from 5° C. to 65° C., wherein the polymerization temperature is at least 30° C. lower than the Tg of the first polymer.

In some embodiments, the concentration of unpolymerized monomer in the reaction vessel is, at any time (T), is no greater than 6%, preferably, no greater than 5%, and more preferably, no greater than 4%, by weight, based on the total weight of reaction mixture present in the reaction vessel at time (T). The formation of the second polymer may be effected in the same reaction vessel or kettle as the formation of the first polymer. It may alternatively be carried out after a period of time in a different reaction vessel or kettle, such as a holding tank or a drain tank.

The polymerization techniques used to prepare aqueous emulsion polymers are well known in the art. In the polymerization of the aqueous dispersion of polymeric particles of this invention, each polymer is prepared independently in the sense that surfactants, initiators, and other additives are selected independently and may be the same or different in kind and amount for each polymer, recognizing, however, that the second polymer is prepared in the presence of previously prepared first polymer. In the emulsion polymerization process, conventional surfactants may be used, such as, for example, anionic and/or nonionic emulsifiers, such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

Free radical polymerization processes, including, for example, thermal, redox, photochemical, and electrochemical initiation, may be used for the formation of the first polymer and the second polymer, independently. In some embodiments, the reaction temperature is maintained at from 5° C. to 65° C. during the formation of at least 10% by weight of the second polymer; a redox polymerization process is preferred during that interval. In certain embodiments, the polymerization of the second polymer is initiated at from 5° C. to 40° C., preferably, from 5° C. to 30° C., and more preferably, from 15° C. to 30° C., and allowed to rise such that during the formation of the at least 10% by weight of the second polymer, the reaction temperature is maintained at from 5° C. to 65° C. The monomer may be added neat, i.e., not an emulsion in water, or as an emulsion in water. The monomer may be added in one or more additions or continuously, linearly or not, over the reaction period, or combinations thereof.

Each of the first stage polymer and second stage polymer, independently, may be formed using suitable free radical initiators (oxidants), such as, for example, hydrogen peroxide; sodium or potassium peroxide; t-butyl hydroperoxide; t-alkyl hydroperoxide, t-alkyl peroxide, or t-alkyl perester wherein the t-alkylgroup includes at least 5 carbon atoms; cumene hydroperoxide; ammonium and/or alkali metal persulfates; sodium perborate; perphosphoric acid and salts thereof; potassium permanganate; and ammonium or alkali metal salts of peroxydisulfuric acid, typically, at a level of 0.01% to 3.0% by weight, based on the weight of monomer. Redox systems using one or more oxidants with a suitable reductant, such as, for example, sodium sulfoxylate formaldehyde; ascorbic acid; isoascorbic acid; alkali metal and ammonium salts of sulfur-containing acids, such as sodium sulfite, bisulfite, thiosulfate, hydrosulfite, sulfide, hydrosulfide or dithionite; formadinesulfinic acid; hydroxymethanesulfonic acid; sodium 2-hydroxy-2-sulfinatoacetic acid; acetone bisulfite; amines, such as ethanolamine, glycolic acid; glyoxylic acid hydrate; lactic acid; glyceric acid, malic acid; tartaric acid; and salts of the preceding acids may be used. Redox reaction catalyzing metal salts of iron, copper, manganese, silver, platinum, vanadium, nickel, chromium, palladium, or cobalt may be used for the formation of the first polymer and the second polymer. Typical levels of catalytic metal salts used in accordance with the invention range from 0.01 ppm to 25 ppm. Mixtures of two or more catalytic metal salts may also be usefully employed. Chelating ligands, which can be used with catalytic metal salts, include multidentate aminocarboxylate ligands, such as, for example, nitrilotriacetic acid (NTA, a tetradentate ligand), ethylene diamine diacetic acid (EDDA, a tetradentate ligand), N-(hydroxyethyl) ethylene diamine triacetic acid (HEDTA, a pentadentate ligand), ammonia diacetic acid (ADA, a tridentate ligand) and ethylene diamine tetraacetic acid (EDTA, a hexadentate ligand).

Chain transfer agents, such as, for example, halogen compounds, including tetrabromomethane; allyl compounds; or mercaptans, such as alkyl thioglycolates, alkyl mercaptoalkanoates, and $C_4$-$C_{22}$ linear or branched alkyl mercaptans may be used to lower the molecular weight of the formed first polymer and second polymer, independently, and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period.

The polymeric particles of the aqueous dispersion have an average particle diameter of from 200 to 1500 nanometers (nm), preferably of from 200-600 nm. Also contemplated are multimodal particle size emulsion polymers, where one or more of the particle size modes are polymeric particles of the present invention and wherein two or more distinct particle sizes or very broad distributions are provided, as is taught in U.S. Pat. Nos. 5,340,858; 5,350,787; 5,352,720; 4,539,361; and 4,456,726.

In some embodiments, the particles of the first polymer are uniform in composition. However, in certain embodiments, the particles of the first polymer include more than one phase and may be effected, for example, by a multistage emulsion polymerization. A multistage emulsion polymerization process in which at least two stages differing in composition are polymerized in sequential fashion usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases partially encapsulating the core, core/shell particles with a multiplicity of cores, and interpenetrating network particles. The multistage emulsion polymer can be formed in two or more stages, where the stages differ in molecular weight as well as, or in addition to, differ in composition.

In some embodiments, the first polymer particles include, when dry, at least one void. First polymer particles, which include a single void formed by multistage emulsion polymerization, are known in the art and disclosed in U.S. Pat. Nos. 4,427,836; 4,469,825; 4,594,363; 4,880,842; 4,970,241; 4,677,003; 4,985,064; 5,225,279; 5,494,971; 5,545,695; 5,510,422; 5,527,613; 6,020,435; 6,252,004; 6,139,961; 6,673,451; and 6,784,262. The first polymer particles of the invention are also disclosed in published U.S. Publication Nos. 20010009929; 20010036990; and 20030129435. Suitable first polymer particles may also contain, when dry, multiple voids; by "multiple voids" herein is meant two or more voids, whether isolated or connected to other voids, whether substantially spherical in shape or not, including, for example, void channels, interpenetrating networks of void and polymer, and sponge-like structures, such as are disclosed, for example, in U.S. Pat. Nos. 5,036,109; 5,157,084; 5,216,044; and 5,989,630. Multiple voids may be formed within a first polymeric particle fully or partially enclosed by a shell polymer. In alternative embodiments, first polymer particles include one or more core polymer(s) that can be dissolved out of the first polymer particle to form, when dry, a void. In additional embodiments, first polymer particles, including or previously including pigment particles, such as, for example, titanium dioxide and silicon oxide, supercritical carbon dioxide, FREON™, and oxidizable compounds are also contemplated. It is preferred that the predominant amount of the outermost polymeric surface of the first polymer particle has a Tg of greater than 50° C., preferably greater than 75° C., and more preferably greater 90° C.

In some embodiments, the first polymer with at least one void, when dry, may be formed according to the methods of U.S. Pat. No. 6,632,531. In such embodiments, a first polymer of the invention is preferably formed in the presence of at least one fugitive substance, i.e., any substance having a normal boiling point of less than 30° C., and the second polymer of the invention is polymerized in the presence of the first polymer. In such embodiments, the second polymer may be formed either before or after the removal of the fugitive substance.

In such embodiments, a fugitive substance is preferably selected from the group consisting of carbon dioxide, 2,2-dimethylypropane, dichlorofluoromethane, 1,2-dichlorotetrafluoroethane, butane, 1,1,2,2-tetrafluoroethane, 1,1,1,2-tetrafluoroethane, dimethyl ether, 1,1-difluoroethane, octafluoropropane, chlorodifluoromethane, propane, pentafluoroethane, difluoromethane, sulfur hexafluoride, hexafluoroethane, carbon dioxide, chlorotrifluoromethane, trifluoromethane, ethane, tetrafluoromethane, methane, difluoromethane, hexafluoroethane, carbon dioxide, chlorotrifluoromethane, trifluoromethane, ethane, tetrafluoromethane, methane, and combinations thereof.

In embodiments where the first polymer particles include, when dry, at least one void, it is preferred that void size be in the range of from 100 to 1200 nm. In some embodiments where the inventive particles increase the opacity of films in which they are present, it is preferred that void size be in the range of from 200 to 600 nm, and more preferably 250 to 450 nm. In some embodiments, for instance, where the inventive particles are used in paper coatings, particularly in applications where the paper coatings undergo calendaring to improve gloss, it is preferred that void size be in the range of from 750 to 1200 nm, and more preferably 1000 to 1200 nm.

Aqueous dispersions comprising the inventive particles may further comprise from 5 to 95%, preferably, 5 to 50%, and more preferably, 5 to 35%, by weight, based on the total polymeric weight of the dispersion, unvoided, or solid particles. The unvoided particles may have Tg values ranging from −50° C. to 50° C. and typically have particle sizes of from less than 10 nm to more than 1000 nm, preferably from 30 to 500 nm, and more preferably from 40 to 200 nm. In such embodiments, there may be populations of voided particles having different mean particle sizes, i.e., bimodal or polymodal particle size distributions. In some embodiments, for example, when the inventive dispersions are used in the formulation of coatings that can be applied to aged or weathered substrates, it may be desirable to have from 20 to 35% by weight, based on the total polymeric content of the dispersion, of unvoided particles having a particle size of from 10 to 100 nm, and preferably 40 to 80 nm.

The polymeric particles of the invention include a first polymer and a second polymer substantially encapsulating the first polymer. "Substantially encapsulating the first polymer" means that greater than 50% of the surface area of the first polymer particle must be covered by the second polymer. Preferably, greater than 75%, and more preferably 100%, of the surface area of the first polymer particle is covered by the second polymer. The extent of coverage or encapsulation of the polymeric particles may be determined by scanning electron microscopy, with or without staining techniques, as is well-known in the art.

The aqueous dispersion of polymeric particles typically has a solids content of greater than 30%, and preferably, greater than 40%, by weight. The presence of polymer particles having a particle size smaller than the inventive particles may produce dispersions with solids content approaching 70% or more. Further, high solids content, or the presence of smaller particles, or combinations of both, may prevent settling or sedimentation of the inventive particles. High solids content herein refers to solids contents of greater than 50%, and preferably, greater than 60%, by weight.

The present invention in one embodiment serves to provide an aqueous coating composition suitable for use, when dry, as a coating, "coating" herein, including, for example, paint, clearcoat, topcoat, primer, paper coating, leather coating, textile and nonwoven fabric coating and saturant, elastomeric coating, caulk, sealant, and adhesive. Such a coating typically exhibits improvement in film formation, particularly at temperatures lower than 30° C. or at VOC levels below 5% by weight, based on the total weight of the aqueous coating composition, and/or film integrity, relative to a coating in which an aqueous dispersion of similar polymeric particles having a first polymer comprising less than 0.05% by weight, based on the weight of the first polymer, copolymerized multi-ethylenically unsaturated monomer.

The inventive polymers may be used advantageously as binders in the formulation of pigmented coatings. "Binder," as used herein, refers to a component in a formulation that provides integrity to films formed by the drying of the formulation. In relatively low PVC coating formulations, the binder may achieve this effect by forming a fairly continuous film in which the other components, including pigments and extenders, are embedded. The binder may also act to form points of adhesion between particles of other components in the formulation, for instance, pigments and extenders. This binding mechanism is more common in relatively high PVC formulations where the binder may not be present in a quantity adequate to form a continuous film. Dispersions of polymeric particles are commonly used as binders in aqueous coatings formulations. Typically, binder particles are of such character as to be film-forming at the temperature at which the formulation is dried. Alternately, solvents or coalescents may be added to soften binder particles as to cause them to be film-forming.

Pigmented coating formulations using the inventive polymer particles as binders may provide greater opacity than analogous formulations using traditional non-voided polymer particles as binder. Alternately, a formulator may achieve a desired level of opacity in coating formulations using the particles of the invention as binder by using a lower level of pigment and/or extender than would be required to achieve the same level of opacity in a comparable formulation using traditional non-voided polymer particles as binder.

An aqueous coating composition having the aqueous dispersion of the invention is prepared by techniques that are well known in the coatings art. First, if the aqueous coating composition is to be pigmented, at least one pigment is typically well dispersed in an aqueous medium under high shear, such as is afforded by a COWLES® mixer. Then, the aqueous dispersion of polymeric particles is added under lower shear stirring, along with other coating adjuvants as desired. Alternatively, the aqueous dispersion of polymeric particles may be included in the pigment dispersion step. The aqueous coating composition may contain conventional coating adjuvants, such as, for example, tackifiers, pigments, extenders, emulsifiers, crosslinkers, coalescing agents, buffers, neutralizers, thickeners or rheology modifiers, humectants, wetting agents, biocides, plasticizers, antifoaming agents, colorants, waxes, and anti-oxidants. The aqueous coating composition may contain up to 75% by weight, based on the weight of the polymeric particles, of an emulsion polymer not meeting the description of the aqueous dispersion of polymeric particles of the invention, such as a film-forming and/or a non-film-forming emulsion polymer.

Examples of suitable pigments and extenders for use in the formulation of coatings include titanium dioxide, such as anatase and rutile titanium dioxides; zinc oxide; antimony oxide; iron oxide; magnesium silicate; calcium carbonate; organic and inorganic colored pigments; aluminosilcates; silica; various clays, such as kaolin and delaminated clay; and lead oxide. The amounts of pigment and extender in the aqueous coating composition vary from a pigment volume concentration (PVC) of 0 to 95 and thereby encompass coatings otherwise described in the art, for example, clear coatings, stains, flat coatings, satin coatings, semi-gloss coatings, gloss coatings, primers, and textured coatings. The pigment volume concentration is calculated by the following formula:

$$PVC(\%) = \frac{(\text{volume of pigment(s)} + \text{volume extender(s)}) \times 100}{\text{total dry volume of paint}}$$

In one embodiment, the aqueous coating composition includes a photosensitive moiety. The photosensitive moiety is capable of absorbing some portion of the solar light spectrum and, without being bound by a particular theory, potentially acting as a photoinitiator for crosslinking of the polymer during exterior exposure. The photosensitive moiety can be a photosensitive compound added to the aqueous coating composition before, during, or after the formation of the aqueous dispersion, or a photosensitive group that is chemically incorporated into one or more of the polymers, preferably the second polymer, of the aqueous dispersion of polymeric particles, for example, by copolymerization. Examples of photosensitive compounds are benzophenone derivatives, wherein one or both of the phenyl rings are substituted, such as, for example, benzophenone, 4-methyl benzophenone, 4-hydroxy benzophenone, 4-amino benzophenone, 4-chloro benzophenone, 4-hydroxycarboxyl benzophenone, 4,4'-dimethyl benzophenone, 4,4'-dichloro benzophenone, 4-carboxymethyl benzophenone, 3-nitro benzophenone, and substituted phenyl ketones, such as substituted phenyl acetophenones. The photosensitive groups may be present in one or more of the stages as copolymerized ethylenically unsaturated monomers that contain photosensitive groups. Examples of ethylenically unsaturated monomers that contain photosensitive groups include vinyl toluene, allyl benzoylbenzoates and monomers incorporating pendant benzophenonegroups, such as vinylbenzyl methylbenzoylbenzoate, hydroxymethacryloxypropyl methylbenzoylbenzoate, hydroxymethacryloxypropyl benzoylbenzoate, and hydroxymethacryloxypropoxy benzophenone. A preferred photosensitive compound is benzophenone. The aqueous coating composition may contain from 0.1 to 5%, preferably, from 0.1 to 3%, and more preferably, 0.1 to 1% by weight of one or more photosensitive compounds, based on dry polymer weight.

Preferably, the aqueous coating composition contains less than 5% VOC by weight, more preferably less than 3% VOC, and even more preferably less than 1.7% VOC by weight, based on the total weight of the aqueous coating composition.

A volatile organic compound (VOC) is defined herein as a carbon-containing compound that has a boiling point below 280° C. at atmospheric pressure.

Additionally, the aqueous coating composition may contain coalescing agents, some of which are not VOCs, e.g., coalescing agents having a boiling point above 280° C. at atmospheric pressure. A coalescing agent is a compound that is added to an aqueous dispersion of polymeric particles, paint or coating and which reduces the minimum film forming temperature (MFFT) of the aqueous dispersion of polymeric particles or aqueous coating composition by at least 1° C. The MFFT is measured using ASTM test method D2354. Examples of coalescing agents that are not VOCs include plasticizers, low molecular weight polymers, surfactants, and autooxidizable plasticizers, such as alkyl esters of unsaturated fatty acids. Preferred are alkyl esters prepared from oils, such as linseed, tung, dehydrated castor, soybean, tall, sunflower, and corn. Examples of non-VOC coalescing agents include esters of unsaturated fatty acids, such as mono, di-, or tri-unsaturated fatty acids. Suitable unsaturated fatty acid esters include monounsaturated fatty acid esters formed from palmitoleic acid, oleic acid, or caproleic acid; diunsaturated fatty acid esters formed from linoleic acid; triunsaturated fatty acid esters formed from linolenic acid or eleosteric acid; or mixtures thereof. Suitable esters of unsaturated fatty acids includes alkyl esters, such as methyl and ethyl esters; substituted alkyl esters, such as esters formed from ethyleneglycol and propyleneglycol and alkyl ether esters of unsaturated fatty acids; diethyleneglycol, triethyleneglycol; dipropyleneglycol; tripropyleneglycol; and diethyleneglycol monobutyl ether. In one embodiment, the above autooxidizable plasticizers are used in conjunction with an aqueous dispersion of polymeric particles which contain 0.25% to 12.5% of acetoacetoxyethyl(meth)acrylate as copolymerized units, based on the total weight of the polymeric particles. Autooxidation can be enhanced by the use of metal ion catalysts, such as cobalt, zirconium, calcium, manganese, copper, zinc and iron. Simple salts, such as halides, nitrates, and sulfates may be used, but in many cases, an organic anion, such as acetate, naphthenate or acetoacetate, is used.

Typical methods of paint or coating preparation may introduce adventitious VOCs from the aqueous dispersion of polymeric particles, biocides, defoamers, soaps, dispersants, and thickeners. These typically account for 0.1% VOC by weight, based on the total weight of the aqueous coating composition. Additional methods such as, for example, steam stripping of the aqueous dispersion of polymeric particles and selection of low VOC containing additives, such as biocides, defoamers, soaps, dispersants, and thickeners, may be used to further reduce the paint or coating to less than 0.01% VOC by weight, based on the total weight of the aqueous coating composition.

The solids content of the aqueous coating composition may be from 10% to 85% by volume. The viscosity of the aqueous composition may be from 0.05 to 2000 Pa·s (50 cps to 2,000,000 cps), as measured using a Brookfield viscometer; the viscosities appropriate for different end uses and application methods vary considerably.

The aqueous coating composition may be applied by conventional application methods, such as, for example, brush or paint roller, air-atomized spray, air-assisted spray, airless spray, high volume low pressure spray, air-assisted airless spray, and electrostatic spray. The aqueous coating composition may be applied to a substrate, such as, for example, plastic, including sheets and films; glass; wood; metal, such as aluminum, steel, and phosphate or chromate-treated steel; previously painted surfaces; weathered surfaces; cementitious substrates; and asphaltic substrates, with or without a prior substrate treatment, such as a primer. The aqueous composition coated on the substrate is typically dried, or allowed to dry, at a temperature from 5° C. to 95° C.

A preferred process for forming dispersions of the invention wherein the first polymer comprises, when dry, at least one void is analogous to that disclosed in published U.S. Publication No. 20010009929. In the preferred process of the invention, there is provided an aqueous dispersion of multistage emulsion polymer, comprising a core stage polymer (the "core") and a first shell stage polymer (the "first shell"). The core and first shell may themselves be comprised of more than one stage. There may also be one or more intermediate stages. Preferably, the multi-stage polymer comprises a core, an intermediate layer and a shell. The intermediate layer is as described in U.S. Publication No. 20010009929.

According to the preferred process, a second shell stage polymer (the "second shell"), which substantially encapsulates the first shell stage polymer, is subsequently formed by adding to the emulsion of multi-staged polymer at least one mono-ethylenically unsaturated monomer and causing at least 10% of the monomer to polymerize, at a temperature of from 5° C. to 65° C., in the presence of the multi-staged polymer. This temperature is at least 30° C. lower than the calculated Tg of the first shell stage polymer. The core of the multi-stage emulsion polymer is caused to swell by the addition of a swelling agent to the aqueous dispersion prior to, during, or after the polymerization of the monomers comprising the second shell stage polymer.

In this process, the first shell stage polymer has the characteristics herein attributed to the first polymer of the invention and the second shell stage polymer has the characteristics herein attributed to the second polymer of the invention. Preferably, the first stage shell polymer has a calculated Tg of at least 50° C. and comprises, as polymerized units, at least 50% by weight of nonionic monoethylenically unsaturated monomer.

The cores of the multi-stage polymers used in the preferred process are as described in U.S. Publication No. 20010009929. The cores, preferably, are emulsion polymers comprising, as polymerized units, from 5 to 100% by weight, based on the weight of the core, of at least one hydrophilic monoethylenically unsaturated monomer and from 0 to 95% by weight, based on the weight of the core stage polymer, of at least one nonionic monoethylenically unsaturated monomer.

The core, whether obtained by a single stage process or a process involving several stages, has an average particle size diameter of from 50 nm to 1.0 micron, and preferably, from 100 nm to 300 nm, in an unswollen condition. If the core is obtained from a seed polymer, such as one described in US Publication No. 20010009929, the seed polymer, preferably, has an average particle size of from 30 nm to 200 nm. The core may also optionally contain less than 20% by weight, and preferably from 0.1 to 3% by weight, based on the total weight of the core, of multi-ethylenically unsaturated monomer.

Within the context of the preferred process, suitable hydrophilic monoethylenically unsaturated monomers useful for making the core polymer include monoethylenically unsaturated monomers containing acid-functionality, such as monomers containing at least one carboxylic acid group, including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate. Acrylic acid and methacrylic acid are preferred.

One or more swelling agents may be used in the process. Suitable swelling agents include those which, in the presence of the multistage emulsion polymer and monomer, are capable of permeating shell polymers and swelling the core. Swelling agents may be aqueous or gaseous, volatile or fixed bases, or combinations thereof.

Suitable swelling agents include volatile bases, such as ammonia, ammonium hydroxide, and volatile lower aliphatic amines, such as morpholine, trimethylamine, and triethylamine; fixed or permanent bases, such as potassium hydroxide, lithium hydroxide, zinc ammonium complex, copper ammonium complex, silver ammonium complex, strontium hydroxide, and barium hydroxide. Solvents, such as, for example, ethanol, hexanol, octanol, Texanol® solvent and those described in U.S. Pat. No. 4,594,363, may be added to aid in fixed or permanent base penetration. Ammonia and ammonium hydroxide are preferred.

The core of the multi-stage emulsion polymer used in the preferred process may be caused to swell by the addition of a swelling agent to the aqueous dispersion prior to, during, or after the polymerization of the monomers comprising the second shell stage polymer, but after the formation of the first shell polymer. In a preferred embodiment, swelling agent is added to the aqueous dispersion at a time when the aqueous dispersion comprises at least 0.5% by weight, based on the total polymeric content of polymer in the dispersion, of unreacted monomer under conditions where there is no substantial polymerization of the monomer; and subsequently reducing the level of monomer by at least 50%. The phrase "under conditions wherein there is no substantial polymerization of the monomer" and the techniques for achieving such conditions are as described in U.S. Publication No. 20010009929.

Preferably, the amount of swelling agent is in the range of from 75 to 300%, and more preferably in the range of from 90 to 250%, based on the equivalents of the functionality in the core capable of being neutralized. It is also preferable to add the one or more swelling agents to the multistage emulsion polymer while the multistage emulsion polymer is at an elevated temperature, preferably at a temperature within 10° C. of the shell polymerization temperature. Swelling is generally very efficient, i.e., swelling in minimum amount of time under conditions of elevated temperature in the presence of monomer and no substantial polymerization occurring. Under these conditions, swelling is generally complete within 30 minutes, preferably within 20 minutes, and most preferably within 10 minutes, of adding the one or more swelling agents.

After swelling the multistage emulsion polymer in the presence of both monomer and swelling agent, it is desirable to reduce the level of monomer to less than 10,000 ppm, and preferably to less than 5,000 ppm, based on polymer solids. This can be accomplished by any suitable means. Preferably, the level of monomer is reduced by polymerizing the monomer. This can be accomplished by any suitable means, such as by adding one or more initiators recited above. It is preferred to begin to reduce the level of monomer within 20 minutes, and more preferably within 10 minutes, of adding the one or more swelling agents.

The following examples are presented to illustrate the invention. In the examples, the following abbreviations have been used:

BA is Butyl Acrylate;
MMA is Methyl Methacrylate;
MAA is Methacrylic Acid;
t-BHP is t-Butyl Hydroperoxide (70%);
SDS is Sodium Dodecylbenzenesulfonate (23%);
DI is Deionized;
SPS is Sodium Persulphate;
ALMA is Allyl Methacrylate;
L is liter; wt is weight; vol is volume; g is gram; and min is minute.

Test Methods

Particle size: Measurements were made by CHDF using Matec CHDF-2000 (capillary hydrodynamic fractionation); Matec Applied Sciences, Northborough, Mass.

S/Mil Determination: An aqueous dispersion was drawn down over a black vinyl scrub chart. The wet film was dried at 30% relative humidity. A Kubelka-Munk scattering coefficient was determined on the dry film (~2 mil thick) by the method of P. B. Mitton and A. E. Jacobson (Off. Digest, September 1963, p. 871-911). S/mil is measured using a Y-reflectometer with a 45/0 geometry. A Y-reflectometer is a light reflectance meter that measures the Y component of the XYZ color scale. A 45/0 geometry indicates that the light is incident to the coating at an angle of 45 degrees from normal, and that the scattered light is collected at an angle of 0 degrees from normal.

Scrub Resistance: The aqueous coating compositions were drawn down on black vinyl charts using a 7 mil opening film caster. The charts were air dried in a horizontal position for 7 days in an open room kept at 73.5° F. (23° C.)+/−3.5° and 50+/−5% relative humidity. Cut-through scrub resistance that measures the scrub resistance of a paint film by the number of scrub cycles required to erode the paint film to the substrate was determined. The procedure used a nylon bristle brush and a scrub medium prepared by blending an abrasive scrub medium type SC-2 from The Leneta Company, Inc. (Mahwah, N.J.), water and defoamer. The paint charts were secured in the abrasion tester on an aluminum plate containing shims. The brush was mounted in the holder and 10 g of scrub medium were spread evenly on the brush bristles. The cycle counter was set at zero and the test was started. After each 400 cycles before failure, 10 more grams of scrub medium was added. The number of cycles to remove the paint film fully in one continuous line across a ½ inch width of the shim was recorded. The reported values were an average of eight measurements.

BCOP hiding factor: A sample of the aqueous dispersion to be tested is blended with a BCOP (Binder Coated Opaque Polymer) Reference Dispersion (defined below). The relative quantities of the test dispersion and BCOP Reference Dispersion are selected such that the resultant blend comprises 30% by weight, based on the total polymer weight of the blend, of polymer solids from the test binder, and 70% by weight, based on the total polymer weight of the blend, of polymer solids from the BCOP Reference Dispersion. A 7 mil wet film of the blend is drawn down over a black vinyl scrub chart (Leneta # P121010N). The black vinyl scrub chart has been measured for thickness (in mils) in four defined areas using, for example, an Ames gauge (#2-212C) available from the Ames Corporation of Waltham, Mass. The film is dried for two hours in a low relative humidity (<40% Relative Humidity, where if Relative Humidity is any %<40% during drying, BCOP hiding factor will not change substantially) chamber or room. The reflectance of the dry film is measured by a reflectometer, for instance, a Gardner Instrument Reflectometer (BYK-Gardner of Columbia, Md.), over the four defined areas.

The thickness of the film is also determined over each of the defined areas using the Ames gauge. The BCOP hiding factor is calculated for each of the four defined areas as:

$$BCOP \text{ hiding factor} = \frac{R}{(1-R) \times t}$$

where R=reflectance; and
t=film thickness in mils.

The average of the four measurements is taken as the BCOP hiding factor for the dried film. Preferably, in the invention, the BCOP hiding factor is at least 0.1.

BCOP 80% hiding factor: The procedure and calculation as described for the determination of the BCOP hiding factor are reproduced with the exception that the film is dried overnight at 25° C./80% Relative Humidity in a temperature/humidity chamber (Hotpack, Model # 417532 available from SP Industries, Inc. of Warminster, PA) and then dried at <40% Relative Humidity for one hour in a low humidity chamber/room.

BCOP Stability Factor:

$BCOP$ stability factor=1−($BCOP$ 80% hiding factor/ $BCOP$ hiding factor)

In the invention, preferably, the BCOP stability factor is less than 0.5.

BCOP Reference Dispersion

The BCOP Reference Dispersion is formed by the following process: 936 g BA, 840.6 g MMA, 23.4 g AA, and 82.7 g of a 30% aqueous solution of polyethyleneglycol lauryl ether sodium sulfate were combined with 674 g of DI water and the mixture was agitated with a hand-held homogenizer for 30 seconds to form an emulsion. 938 g of DI water and 3.6 g of a 30% aqueous solution of polyethyleneglycol lauryl ether sodium sulfate were added to a 4 neck 5 L round bottom glass kettle equipped with temperature control, condenser, and mechanical agitation. The kettle was heated to 85° C. under nitrogen while stirring. With the kettle temperature at 85° C., a 76 g aliquot of the homogenized monomer emulsion was added to the kettle, immediately followed by 7.2 g of APS dissolved in 20 g of water. The resulting mixture was held with agitation for 5 min. The remaining monomer emulsion was then fed to the kettle over approximately 80 min while maintaining the reaction temperature at 85° C.

Upon completion of the monomer emulsion feed, the contents of the kettle were held at 85° C. for an additional 10 min before being allowed to cool to 60° C. 20 g of 0.10 wt % iron sulfate solution were added to the kettle followed by the addition of 3.6 g of 70% t-BHP dissolved in 58 g of water and 1.8 g of iso-ascorbic acid dissolved in 58 g of water over approximately 30 min. The kettle was allowed to cool to ambient temperature. At 30° C., the pH of the emulsion was adjusted to pH 9 by addition of ammonium hydroxide. The emulsion was removed from the kettle and filtered. The final latex was 49.0 wt % solids. Particle size was 106 nm.

EXAMPLES

Example 1

Formation of first polymer: A 5 L, four necked round bottom flask was equipped with paddle stirrer, thermometer, nitrogen inlet, and reflux condenser. DI water, 1200 g, was added to the kettle and heated to 85° C. under a nitrogen atmosphere. A monomer emulsion (ME) was prepared by mixing 370 g DI water, 18.0 g SDS, 24.0 g MAA, 1056 g MMA, and 120 g BA. From this ME, 45 g were removed and set aside. With the kettle water at 85° C., 34.0 g SDS was added to the kettle. This was followed by the addition of the 45 g of ME previously set aside to the kettle and the addition of a solution of 5.0 g SPS in 50 g DI water. The contents of the kettle were stirred for 15 min. The remaining ME was then fed to the kettle over a 2 hour period at 85° C. After the completion of the monomer feed the dispersion was held at 85° C. for 15 min, cooled to 25° C. and filtered. The filtered dispersion had a solids content of 40.0% and an average particle diameter of 55 nm.

Example 2

Formation of first polymer: Using the same equipment as in Example 1, DI water, 1200 g, was added to the kettle and heated to 85° C. under a nitrogen atmosphere. A ME was prepared by mixing 370 g DI water, 18.0 g SDS, 24.0 g MAA, 1056 g MMA, and 120 g BA. From this ME, 45 g were removed and set aside. With the kettle water at 85° C., 18.0 g SDS was added to the kettle. This was followed by the addition of the 45 g of ME previously set aside to the kettle and the addition of a solution of 5.0 g SPS in 50 g DI water. The contents of the kettle were stirred for 15 min. The remaining ME was then fed to the kettle over a 2 hour period at 85° C. After the completion of the monomer feed the dispersion was held at 85° C. for 15 min, cooled to 25° C. and filtered. The filtered dispersion had a solids content of 40.0% and an average particle diameter of 70 nm.

Example 3

Formation of first polymer: Using the same equipment as in Example 1, DI water, 1900 g, was added to the kettle and heated to 85° C. under a nitrogen atmosphere. A ME was prepared by mixing 550 g DI water, 28.0 g SDS, 18.0 g MAA, and 1782 g styrene. From this ME, 65 g were removed and set aside. With the kettle water at 85° C., 110.0 g SDS was added to the kettle. This was followed by the addition of the 65 g of ME previously set aside to the kettle and the addition of a solution of 6.7 g SPS in 50 g DI water. The contents of the kettle were stirred for 15 min. The remaining ME was then fed to the kettle over a 2 hour period at 85° C. After the completion of the monomer feed the dispersion was held at 85° C. for 15 min, cooled to 25° C. and filtered. The filtered dispersion had a solids content of 39.7% and an average particle diameter of 58 nm.

Example 4

Formation of first polymer: Using the same equipment as in Example 1, DI water, 1900 g, was added to the kettle and heated to 85° C. under a nitrogen atmosphere. A ME was prepared by mixing 550 g DI water, 28.0 g SDS, 18.0 g MAA, and 1782 g styrene. With the kettle water at 85° C., 110.0 g SDS was added to the kettle. Next, a solution of 6.7 g SPS in 50 g DI water was added to the kettle. The ME was then fed to the kettle over a 2 hour period at 85° C. After the completion of the monomer feed the dispersion was held at 85° C. for 15 min, cooled to 25° C. and filtered. The filtered dispersion had a solids content of 40.0% and an average particle diameter of 50 nm.

Example 5

Formation of first polymer: Using the same equipment as in Example 1, DI water, 1200 g, was added to the kettle and heated to 85° C. under a nitrogen atmosphere. A ME was prepared by mixing 370 g DI water, 18.2 g SDS, 12.0 g MAA, and 1188 g styrene. From this ME, 45 g were removed and set aside. With the kettle water at 85° C., 18.2 g SDS was added to the kettle. This was followed by the addition of the 45 g of ME previously set aside to the kettle and the addition of a solution of 5.0 g SPS in 50 g DI water. The contents of the kettle were stirred for 15 min. The remaining ME was then fed to the kettle over a 2 hour period at 85° C. After the completion of the monomer feed the dispersion was held at 85° C. for 15 min, cooled to 25° C. and filtered. The filtered dispersion had a solids content of 38.8% and an average particle diameter of 101 nm.

Example 6

Formation of first polymer: Using the same equipment as in Example 1, DI water, 1200 g, was added to the kettle and heated to 85° C. under a nitrogen atmosphere. A ME was prepared by mixing 370 g DI water, 18.2 g SDS, 12.0 g MAA, and 1188 g styrene. From this ME, 45 g were removed and set aside. With the kettle water at 85° C., 7.8 g SDS was added to the kettle. This was followed by the addition of the 45 g of ME previously set aside to the kettle and the addition of a solution of 5.0 g SPS in 50 g DI water. The contents of the kettle were stirred for 15 min. The remaining ME was then fed to the kettle over a 2 hour period at 85° C. After the completion of the monomer feed the dispersion was held at 85° C. for 15 min, cooled to 25° C. and filtered. The filtered dispersion had a solids content of 39.5% and an average particle diameter of 145 nm.

Example 7

Formation of aqueous dispersion of polymeric particles: Using the same equipment as in Example 1, DI water, 800 g, was added to the kettle along with 375 g of the first polymer of Example 1 and adjusted to 25° C. under a nitrogen atmosphere. A ME was prepared by mixing 340 g DI water, 22.0 g SDS, 13.5 g MAA, 553.5 g MMA, and 783.0 g BA. With the kettle temperature at 25° C., a solution of 20 g of 0.1% iron sulfate and 2 g of 1% ethylenediamine tetra acetic acid, sodium salt (versene) was added to the kettle. 2 min later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. 2 min later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered to remove any coagulum. The filtered dispersion had a solids content of 43.5% and an average particle diameter of 117 nm.

Example 8

Formation of aqueous dispersion of polymeric particles: Using the same equipment as in Example 1, DI water, 800 g, was added to the kettle along with 373 g of the first polymer of Example 2 and adjusted to 25° C. under a nitrogen atmosphere. A ME was prepared by mixing 340 g DI water, 22.0 g SDS, 13.5 g MAA, 553.5 g MMA, and 783.0 g BA. With the kettle temperature at 25° C., a solution of 20 g of 0.1% iron sulfate and 2 g 1% versene was added to the kettle. 2 min later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. 2 min later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 43.5% and an average particle diameter of 148 nm.

Example 9

Formation of aqueous dispersion of polymeric particles: Using the same equipment as in Example 1, DI water, 1000 g, was added to the kettle along with 377.8 g of the first polymer of Example 3 and adjusted to 22° C. under a nitrogen atmosphere. A ME was prepared by mixing 340 g DI water, 22.0 g SDS, 13.5 g MAA, 553.5 g MMA, and 783.0 g BA. With the kettle temperature at 25° C., a solution of 20 g 0.1% iron sulfate and 2 g 1% versene was added to the kettle. 2 min later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. 2 min later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 40.9% and an average particle diameter of 135 nm.

Example 10

Formation of aqueous dispersion of polymeric particles: Using the same equipment as in Example 1, DI water, 800 g, was added to the kettle along with 375 g of the first polymer of Example 4 and adjusted to 25° C. under a nitrogen atmosphere. A ME was prepared by mixing 340 g DI water, 22.0 g SDS, 13.5 g MAA, 553.5 g MMA, and 783.0 g BA. With the kettle temperature at 25° C., a solution of 20 g 0.1% iron sulfate and 2 g 1% versene was added to the kettle. 2 min later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. 2 min later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 40.3% and an average particle diameter of 118 nm.

Example 11

Formation of aqueous dispersion of polymeric particles: Using the same equipment as in Example 1, DI water, 800 g, was added to the kettle along with 580 g of the first polymer core of Example 5 and adjusted to 25° C. under a nitrogen atmosphere. A ME was prepared by mixing 280 g DI water, 18.5 g SDS, 11.2 g MAA, 461.3 g MMA, and 652.5 g BA. With the kettle temperature at 25° C., a solution of 20 g 0.1% iron sulfate and 2 g 1% versene was added to the kettle. 2 min later co-feed #1 consisting of 3.2 g t-BHP dissolved in 80 g DI water, and co-feed #2 consisting of 2.25 g iso-ascorbic acid dissolved in 80 g DI water were fed to the reactor at a rate of 0.5 g/min. 2 min later the feed of the ME was started at a rate of 5.0 g/min. The ME feed rate was gradually increased so the ME feed finished in 120 min and the temperature is allowed to rise without any external heat or cooling. The temperature at the end of the ME was ~60° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 43.2% and an average particle diameter of 173 nm.

Example 12

Formation of aqueous dispersion of polymeric particles: Using the same equipment as in Example 1, DI water, 800 g, was added to the kettle along with 569.6 g of the first polymer of Example 6 and adjusted to 25° C. under a nitrogen atmosphere. A ME was prepared by mixing 280 g DI water, 18.5 g SDS, 11.2 g MAA, 461.3 g MMA, and 652.5 g BA. With the kettle temperature at 25° C., a solution of 20 g 0.1% iron sulfate and 2 g 1% versene was added to the kettle. 2 min later co-feed #1 consisting of 3.2 g t-BHP dissolved in 80 g DI water, and co-feed #2 consisting of 2.25 g iso-ascorbic acid dissolved in 80 g DI water were fed to the reactor at a rate of 0.5 g/min. 2 min later the feed of the ME was started at a rate of 5.0 g/min. The ME feed rate was gradually increased so the ME feed finished in 120 min and the temperature was allowed to rise without any external heat or cooling. The temperature at the end of the ME was ~60° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 42.7% and an average particle diameter of 247 nm.

Comparative Example A

Formation of aqueous dispersion of polymeric particles: Using the same equipment as in Example 1, DI water, 1000 g, was added to the kettle and heated to 90° under a nitrogen atmosphere. A ME was prepared by mixing 340 g DI water, 22.0 g SDS, 13.5 g MAA, 553.5 g MMA, and 783.0 g BA. With the kettle temperature at 90° C., a solution of 4.4 g SPS in 40 g DI water was added to the kettle. Next, 373 g of the first polymer of Example 2 was added to the kettle. Beginning with the temperature at 78° C. the above ME along with a solution of 1.0 g SPS in 90 g DI water were co-fed to the kettle over a three hour period. The temperature of the kettle was allowed to rise to 85° C. Upon the completion of the ME feed and the co-feed the batch was held at 85° C. for another 15 m. 12 g ammonium hydroxide (28%) was added to the kettle. The dispersion was then cooled to 25° C. and filtered. The filtered dispersion had a solids content of 44.7% and an average particle diameter of 157 nm.

Comparative Example B

Formation of aqueous dispersion of polymeric particles: Using the same equipment as in Example 1, DI water, 1000 g, was added to the kettle and heated to 90° under a nitrogen atmosphere. A ME was prepared by mixing 340 g DI water, 22.0 g SDS, 13.5 g MAA, 553.5 g MMA, and 783.0 g BA. With the kettle temperature at 90° C., a solution of 4.4 g SPS in 40 g DI water was added to the kettle. Next, 377.8 g of the first polymer of Example 3 was added to the kettle. Beginning with the temperature at 78° C. the above ME along with a solution of 1.0 g SPS in 90 g DI water were co-fed to the kettle over a three hour period. The temperature of the kettle was allowed to rise to 85°. Upon the completion of the ME feed and the co-feed the batch was held at 85° C. for another 15 min. 12 g ammonium hydroxide (28%) was added to the kettle. The dispersion was then cooled to 25° C. and filtered. The filtered dispersion had a solids content of 44.8% and an average particle diameter of 144 nm.

Example 13

Preparation of polymer cores for preparation of first polymer: A 66 MMA/34 MAA wt % polymer core was prepared according to the teachings of Examples 1-16 of U.S. Pat. No. 6,020,435.

Core #1 The filtered dispersion had a solids content of 31.9 wt % and an average particle size of 108 nm.

Core #2 The filtered dispersion had a solids content of 31.8 wt % and an average particle size of 127 nm.

Core #3 The filtered dispersion had a solids content of 30.8 wt % and an average particle size of 139 nm.

Example 14

Preparation of first polymer (neutralized): Using the same equipment as in Example 1, DI water, 1000 g, was added to the kettle and heated to 89° C. under a nitrogen atmosphere. To the heated kettle water was added 3.7 g SPS in 30 g DI water. This was immediately followed by 219.4 g of Core #1 (Example 1). A monomer emulsion I (ME I), which was prepared by mixing 70 g DI water, 4.7 g SDS, 70.0 g styrene, 61.6 g MMA, and 8.4 g MAA, was added to the kettle over a period of 60 min at 78° C. Upon completion of ME I, a second monomer emulsion (ME II) was prepared by mixing 218.0 g DI water, 9.3 g SDS, 657.3 g styrene, 12.6 g MAA, 4.2 g linseed oil fatty acid, and 2.1 g ALMA. Monomer Emulsion II (ME II) was added to the kettle along with a separate mixture of 0.93 g SPS dissolved in 60 g DI water over 60 min. The temperature of the reaction mixture was allowed to increase to 92° C. Upon completion of the ME II and co-feed, 22 g of a solution of 0.1% iron sulfate and 1% versene in water was added to the kettle. Next, a third monomer emulsion (ME III) which was prepared by mixing 54.0 g DI water, 2.0 g SDS, 168 g styrene, and 2.0 g 4-hydroxy TEMPO was added to the kettle. This was followed by the addition of 500 g hot DI water (90° C.). With the kettle temperature of ~85° C., a solution of 31.0 g 50% sodium hydroxide dissolved in 600 g hot DI water added to the kettle over 10 min. 10 min after the completion of the sodium hydroxide addition, a solution of 1.0 g SPS mixed with 20 g DI water was added to the kettle and the batch was held for 30 min at 85° C. The reaction mixture was then cooled to room temperature and filtered. The final neutralized latex had a solids content of 26.4 wt %, a particle diameter of 398 nm, and a pH of 8.3.

Example 15

Preparation of first polymer (unneutralized): Using the same equipment as in Example 1, DI water, 1200 g, was added to the kettle and heated to 89° C. under a nitrogen atmosphere. To the heated kettle water was added 5.25 g SPS dissolved in 30 g DI water. This was immediately followed by 314.5 g of Core #2 (Example 1). A ME I, which was prepared by mixing 100 g DI water, 6.7 g SDS, 100 g styrene, 88.0 g MMA, and 12 g MAA, was added to the kettle over a period of 60 min at 78° C. Upon completion of ME I, a ME II was prepared by mixing 400 g DI water, 18 g SDS, 1179 g styrene, 18.0 g MAA, 6 g linseed oil fatty acid, and 3.0 g ALMA. ME II was added to the kettle along with a separate mixture of 1.3 g SPS dissolved in 90 g DI water over 60 min. The temperature of the reaction mixture was allowed to increase to 92° C. Upon completion of the ME II and co-feed, the reaction mixture was held for 30 min at 85° C. and then cooled to room temperature and filtered to remove any coagulum formed. The final unneutralized latex had a solids content of 39.9 wt %, an average particle diameter of 375 nm, and a pH of 2.2.

Example 16

Preparation of first polymer (unneutralized): A first polymer was prepared using 315.0 g of Core #1 (Ex. 13) following the procedure used in Example 15. The final unneutralized latex had a solids content of 39.8 wt %, an average particle diameter of 315 nm, and a pH of 2.1.

Example 17

Preparation of first polymer (unneutralized): A first polymer was prepared using 315.0 g of Core #3 (Ex. 13) following the procedure used in Example 15. The final unneutralized latex had a solids content of 40.1 wt %, an average particle size of 350 nm, and a pH of 2.2.

Example 18

Preparation of first polymer (unneutralized): Using the same equipment as in Example 1, DI water, 1200 g, was added to the kettle and heated to 89° C. under a nitrogen atmosphere. To the heated kettle water was added 5.25 g SPS dissolved in 30 g DI water. This was immediately followed by 314.5 g of Core #3 (Example 13). A ME I, which was prepared according to Example 3, was added to the kettle over a period of 60 min at 78° C. Upon completion of ME I, a ME II was prepared according to Example 3. ME II was added to the kettle along with a separate mixture of 1.3 g SPS dissolved in 90 g DI water over 60 min. The temperature of the reaction mixture was allowed to increase to 92° C. Upon completion of the ME II and co-feed, the reaction mixture was held for 30 min at 85° C. and then cooled to room temperature and filtered. The final unneutralized latex had a solids content of 40.0 wt %, an average particle diameter of 380 nm, and a pH of 2.2.

Example 19

Formation of aqueous dispersion of polymeric particles: Using the same equipment as in Example 1, DI water, 700 g, was added to the kettle and heated to 85° under a nitrogen atmosphere. 1704 g of the first polymer of Example 14 was added to the kettle and the temperature was adjusted to 60° C. A ME was prepared by mixing 270 g DI water, 15.0 g SDS, 378 g MMA, and 522 g BA. With the kettle temperature at 60° C., a solution of 20 g 0.1% ferrous sulfate mixed with 2 g 1% versene was added to the kettle. Next, co-feeds, including a solution of 2.3 g t-BHP mixed with 80 g DI water, along with a separate solution of 1.8 g iso-ascorbic acid mixed with 80 g DI water, were both added to the kettle at a rate of 0.5 g/min. 2 min after the start of the co-feed solutions, the ME prepared previously was added to the kettle over 120 min. There was no external heat applied to the reaction. The temperature of the kettle was kept at 60° C. for the duration of the ME feed. Upon completion of the ME feed, the co-feed solutions were continued for another 30 min. The dispersion was then cooled to 25° C. and filtered. The filtered dispersion had a solids content of 34.8 wt %, and an average particle diameter of 526 nm.

Example 20

Formation of aqueous dispersion of polymeric particles: Using the same equipment as in Example 1, DI water, 700 g, was added to the kettle and heated to 85° C. under a nitrogen atmosphere. 1704 g of the first polymer of Example 14 was added to the kettle and the temperature was adjusted to 50° C. An ME was prepared by mixing 270 g DI water, 15.0 g SDS, 378 g MMA, and 522 g BA. With the kettle temperature at 50° C., a solution of 20 g 0.1% ferrous sulfate mixed with 2 g 1% versene was added to the kettle. Next, co-feeds, including a solution of 2.3 g t-BHP mixed with 80 g DI water, along with a separate solution of 1.8 g iso-ascorbic acid mixed with 80 g DI water, were both added to the kettle at a rate of 0.5 g/min. 2 min after the start of the co-feed solutions, the ME prepared previously was added to the kettle over 120 min. There was no external heat applied to the reaction. The temperature of the kettle was kept at 50° for the duration of the ME feed. Upon completion of the ME feed, the co-feed solutions were continued for another 30 min. The dispersion was then cooled to 25° C. and filtered. The filtered dispersion had a solids content of 35.5 wt %, and an average particle size of 493 nm.

Example 21

Formation of aqueous dispersion of polymeric particles: Example 20 was repeated, except that DI water, 700 g, was added to the kettle and heated to 76° C. under a nitrogen atmosphere. After 1704 g of the first polymer of Ex. 14 was added to the kettle the temperature was adjusted to 40° C. The temperature of the kettle was kept at 40-44° C. for the duration of the ME feed. The filtered dispersion had a solids content of 34.6%, and an average particle size of 508 nm. The Kubelka-Munk scattering coefficient (S/Mil) was measured on the dried polymer film and found to be 0.89.

Example 22

Formation of aqueous dispersion of polymeric particles: Example 20 was repeated, except that DI water, 700 g, was added to the kettle and heated to 66° C. under a nitrogen atmosphere. After 1704 g of the first polymer of Ex. 14 was added to the kettle the temperature was adjusted to 30° C. The temperature of the kettle was allowed to increase to 58° over the duration of the ME feed. The filtered dispersion had a solids content of 34.5%, and an average particle size of 490 nm. The Kubelka-Munk scattering coefficient (S/Mil) was measured on the dried polymer film and found to be 1.07.

Example 23

Formation of aqueous dispersion of polymeric particles: Using the same equipment as in Example 1, 1125 g of the first polymer of Example 17 was added to the kettle and the temperature was adjusted to 25° C. A ME was prepared by mixing 270 g DI water, 15.0 g SDS, 369 g MMA, 9.0 g MAA, and 522 g BA. With the kettle temperature at 25° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 68 C. Next, 900 g hot DI water (90 C) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.3%, and an average particle diameter of 446 nm. The Kubelka-Munk scattering coefficient (S/Mil) was measured on the dried polymer film and found to be 0.92.

Example 24

Formation of aqueous dispersion of polymeric particles: Using the same equipment as in Example 1, 1125 g of the first polymer of Example 17 was added to the kettle and the temperature was adjusted to 30° C. A ME was prepared by mixing 270 g DI water, 15.0 g SDS, 369 g MMA, 9.0 g MAA, and 522 g BA. With the kettle temperature at 30° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 72° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.5%, and an average particle diameter of 461 nm. The Kubelka-Munk scattering coefficient (S/Mil) was measured on the dried polymer film and found to be 0.85.

Example 25

Formation of aqueous dispersion of polymeric particles: Using the same equipment as in Example 1, 1125 g of the first polymer of Example 17 was added to the kettle and the temperature was adjusted to 40° C. A ME was prepared by mixing 270 g DI water, 15.0 g SDS, 369 g MMA, 9.0 g MAA, and 522 g BA. With the kettle temperature at 40° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 73° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.5%, and an average particle diameter of 466 nm. The Kubelka-Munk scattering coefficient (S/Mil) was measured on the dried polymer film and found to be 0.83.

Example 26

Formation of aqueous dispersion of polymeric particles: Using the same equipment as in Example 1, 1125 g of the first polymer of Example 17 was added to the kettle and the temperature was adjusted to 50° C. A ME was prepared by mixing 270 g DI water, 15.0 g SDS, 369 g MMA, 9.0 g MAA, and 522 g BA. With the kettle temperature at 50° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 77° C. Next, 900 g hot DI water (90 C) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.4%, and an average particle diameter of 466 nm. The Kubelka-Munk scattering coefficient (S/Mil) was measured on the dried polymer film and found to be 0.63.

Example 27

Formation of aqueous dispersion of polymeric particles: Using the same equipment as in Example 1, 1125 g of the first polymer of Example 17 was added to the kettle and the temperature was adjusted to 60° C. A ME was prepared by mixing 270 g DI water, 15.0 g SDS, 369 g MMA, 9.0 g MAA, and 522 g BA. With the kettle temperature at 60° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 79° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 38.5%, and an average particle diameter of 461 nm. The Kubelka-Munk scattering coefficient (S/Mil) was measured on the dried polymer film and found to be 1.44. However, this polymer film showed evidence of porosity or dry hiding. Porosity was confirmed by wetting the polymer film with Isopar L. Hiding decreased on the polymer film under the area wetted by the Isopar L.

Comparative Example C

Formation of aqueous dispersion of polymeric particles: Using the same equipment as in Example 1, 1125 of the first polymer of Example 17 was added to the kettle and the temperature was adjusted to 85° C. A ME was prepared by mixing 270 g DI water, 15.0 g SDS, 369 g MMA, 9.0 g MAA, and 522 g BA. With the kettle temperature at 85° C., a solution of 2.7 g SPS mixed in 90 g DI water was added to the kettle over a 2 hour period along with the ME prepared previously. The temperature of the kettle was kept at 85° C. for the duration of the ME feed. Upon completion of 85% of the ME, without stopping the ME or co-feed, 900 g hot water were added to the kettle along with 32 g ammonium hydroxide. After the remaining 15% of ME and co-feed were fed to the kettle, the reaction was held for 15 min at 85° C. The dispersion was then cooled to 25° C. and filtered to remove any coagulum. The filtered dispersion had a solids content of 39.1%, and an average particle diameter of 519 nm. The Kubelka-Munk scattering coefficient (S/Mil) could not be determined because the polymer did not form an adequate film when dried.

Example 28

Formation of aqueous dispersion of polymeric particles: Using the same equipment as in Example 1, 1125 g of the first polymer of Example 15 was added to the kettle and the temperature was adjusted to 25° C. A ME was prepared by mixing 270 g DI water, 15.0 g SDS, 369 g MMA, 9.0 g MAA, and 522 g BA. With the kettle temperature at 25° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 85% of the ME feed, the ME and co-feeds were stopped and the reaction was held for 5 min. The temperature of the reaction at this point was 68° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 37.2%, and an average particle diameter of 530 nm. The Kubelka-Munk scattering coefficient (S/Mil) was measured on the dried polymer film and found to be 1.39.

Example 29

Formation of aqueous dispersion of polymeric particles: Using the same equipment as in Example 1, DI water, 350 g, was added to the kettle and heated to 30° C. under a nitrogen atmosphere. 1125 g of the first polymer of Example 16 was added to the kettle and the temperature was adjusted to 19° C. A ME was prepared by mixing 270 g DI water, 15.0 g SDS, 378 g MMA, and 522 g BA. Of this ME, 227.5 g were removed and placed in a separate container. Then, 7.2 g MAA was added to the removed 227.5 g of ME. This additional ME was designated ME2. With the kettle temperature at 19° C., a solution of 20 g 0.1% ferrous sulfate mixed with 2 g 1% versene was added to the kettle. Next, co-feeds including a solution of 2.3 g t-BHP mixed with 75 g DI water, along with a separate solution of 1.80 g iso-ascorbic acid mixed with 75 g DI water were both added to the kettle at a rate of 0.5 g/min. 2 min after the start of the co-feed solutions, ME2 prepared previously was added to the kettle at a rate of 5 g/min. The temperature of the kettle was allowed to increase over the duration of the ME2 feed. When the ME2 feed reached completion, 32 g ammonium hydroxide was added to the kettle. The original ME was then fed to the kettle at a rate of 10 g/min. Upon completion of 85% of the ME feed, the ME and co-feeds were stopped and the reaction was held for 2 min. Next, 600 g hot DI water (90° C.) was added to the kettle. The remaining 15% of ME feed was then added to the kettle as a shot. The reaction was held for min. The co-feed solutions were then resumed at a rate of 1.0 g/min until their completion. The dispersion was then cooled to 25° C. and filtered to remove any coagulum. The filtered dispersion had a solids content of 37.6%, and an average particle diameter of 471 nm. The Kubelka-Munk scattering coefficient (S/Mil) was measured on the dried polymer film and found to be 1.24.

Example 30

Formation of aqueous dispersion of polymeric particles: Using the same equipment as in Example 1, 1125 g of the first polymer of Example 18 was added to the kettle and the temperature was adjusted to 25° C. A ME was prepared by mixing 270 g DI water, 15.0 g SDS, 369 g MMA, 9.0 g MAA, and 522 g BA. With the kettle temperature at 25° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 85% of the ME feed, the ME and co-feeds were stopped and the reaction was held for 5 min. The temperature of the reaction at this point was 68° C. Next, 800 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 39.4%, and an average particle diameter of 505 nm. The Kubelka-Munk scattering coefficient (S/Mil) was measured on the dried polymer film and found to be 1.52.

Example 31

Formation and evaluation of aqueous coating compositions: Coating compositions including the following ingredients were prepared.

TABLE 31.1

| Aqueous coating compositions | |
| --- | --- |
| Material | Weight (g) |
| TI-PURE ™ R-746 | 43.0 |
| Aqueous Dispersion of Polymer Particles | 89.81 |
| TERGITOL ™ 15-S-40 | 0.40 |
| COLLOID ™ 643 | 0.40 |
| TEXANOL ™ | 2.92 |
| NATROSOL ™ 250 MHR (3%) | 40.0 |
| Water | 19.63 |

TABLE 31.2

| Evaluation of dry aqueous coating compositions | |
| --- | --- |
| Aqueous Dispersion Example# | Paint Scrubs |
| 7 | 1083 |
| 8 | 1110 |
| 9 | 1515 |
| 10 | 1603 |
| 11 | 1343 |
| 12 | 1253 |
| Comp. A | 715 |
| Comp. B | 1025 |

The dry aqueous coating compositions including the aqueous dispersion of polymer particles of Examples 7-12 of the invention exhibit superior film integrity as measured by scrub resistance relative to the corresponding coatings including the aqueous dispersions, Comparative Examples A and B.

Example 32

Formulation and evaluation of aqueous coating compositions: Coating compositions including the following ingredients was prepared.

TABLE 32.1

| Aqueous coating compositions | |
| --- | --- |
| Material | Weight (g) |
| TI-PURE ™ R-746 | 43.0 |
| Aqueous Dispersion of Polymer Particles | 98.61 |
| TERGITOL ™ 15-S-40 | 0.40 |
| COLLOID ™ 643 | 0.40 |
| TEXANOL ™ | 2.66 |
| NATROSOL ™ 250 MHR (3%) | 47.0 |
| Water | 3.15 |

TABLE 32.2

| Evaluation of examples and dry aqueous coating compositions | | | |
| --- | --- | --- | --- |
| Aqueous Dispersion Example # | S/Mil | Dry density g/cc | Scrubs w/Tex[a] |
| 19 | no film | 0.986 | 598 |
| 20 | no film | 0.8679 | 705 |
| 21 | 0.89 | 0.8806 | 655 |
| 22 | 1.07 | 0.8876 | 700 |
| 23 | 0.92 | 1.0135 | |
| 24 | 0.85 | 1.0194 | 1067 |
| 25 | 0.83 | 1.0042 | 962 |
| 26 | 0.63 | 1.0075 | 923^ |
| 27 | 1.44* | 1.0092 | 832^ |
| Comp. C | no film | 1.0756 | 813^ |
| 28 | 1.39 | 0.9337 | 908 |
| 29 | 1.24 | 0.94 | 506 |
| 30@ | 1.52 | 0.8994 | 821 |

*porosity
^poor films; scrubs misleading
@formulated with 2% TEXANOL ™
[a]scrub data for aqueous coating compositions using the examples in formulations according to Ex. 32

The dry aqueous coating compositions including the aqueous dispersion of polymer particles of Examples 19-30 of the invention exhibit lower dry density, and thereby savings in polymer mass and energy to prepare the polymer with a useful level of film integrity as measured by scrub resistance relative to the corresponding coatings including the aqueous dispersion, Comparative Example C.

Example 33

Formation and evaluation of aqueous traffic paint coating composition: An aqueous dispersion of polymeric particles of this invention (33.3% by weight first polymer and 66.7% second encapsulating polymer having Tg=10° C.) (Example 33) and a commercial traffic paint binder (Comp. Ex. D) were formulated in a fast dry traffic paint as per Table 33.1

TABLE 33.1

Traffic Paint Compositions

| Ingredient | Comp. Ex. D | Example 33 |
|---|---|---|
| FASTRACK ™ 3427 quick-setting binder from Rohm and Haas Company, Philadelphia, PA | 455.8 | 0 |
| Aqueous Dispersion of Polymer Particles | 0 | 482.4 |
| Ammonium Hydroxide, 28% | 0 | 3.9 |
| Polyamine, 26.5% aqueous (as disclosed in U.S. Pat. No. 5,804,627) | 0 | 8.8 |
| TAMOL ™ 901 (30%) dispersant (ammonium salt of a polyelectrolyte) from Rohm and Haas Company | 7.1 | 5.6 |
| SURFYNOL ™ CT-136 acetylenic surfactant from Air Products and Chemicals, Inc., Allentown, PA | 2.8 | 2.8 |
| DREWPLUS ™ L-493 defoamer from Drew Chemical Company, Kearny, NJ | 5.5 | 5.5 |
| TI-PURE ™ R-900 titanium dioxide from E. I. duPont de Nemours & Company, Wilmington, DE | 100.0 | 49.8 |
| OMYACARB ™-5 calcium carbonate from Omya Inc., Proctor, VT | 760.2 | 789.4 |
| After 15 min, added | | |
| Methanol | 30.0 | 0 |
| TEXANOL ® solvent ester alcohol from Eastman Chemicals, Kingsport, TN | 29.9 | 13.1 |
| NATROSOL ® 250HR(2%) thickener from Aqualon, Inc, Wilmington, DE | 6.7 | 22.0 |
| Water | 8.6 | 2.8 |

The traffic paint of Example 33 was formulated with about half the level of titanium dioxide of the comparative traffic paint (Com. Ex. D) and yet exhibited improved hiding and total reflectance as shown in Table 33.2.

TABLE 33.2

Evaluation of dry traffic paint

| Test | Comp. Ex. D | Ex. 33 |
|---|---|---|
| Hiding by Contrast Ratio | 0.90 | 0.95 |
| Total Reflectance | 86.0 | 88.5 |

Comparative Example D

Example 8 from U.S. Pat. No. 4,427,836 was reproduced. The BCOP hiding factor was found to be 0.038.

Comparative Example E

Example #1 from U.S. Pat. No. 6,139,961 was reproduced. The BCOP hiding factor was found to be 0.060.

Example 34

Preparation of first polymer: Using the same equipment as in Example 1, 1200 g of DI water is added to the kettle and heated to 89° C. under a nitrogen atmosphere. 5.25 g of sodium persulfate dissolved in 30 g of DI water is added to the heated kettle. This is immediately followed by the addition of 314.5 g of core #3 (Ex. 13). Prepare monomer emulsion (ME I) by mixing 100 g of DI water, 6.7 g of SDS(23%), 100.0 g of styrene, 88.0 g of methyl methacrylate, and 12.0 g of methacrylic acid and add to the kettle over a period of 60 min at a temperature of 78° C. Upon completion of ME I, prepare a second monomer emulsion (ME II) by mixing 400 g of DI water, 18.0 g of SDS(23%), 1182 g of styrene, 18.0 g of methacrylic acid, and 6.0 g of linseed oil fatty acid (LOFA). Add monomer emulsion II (ME II) to the kettle along with a separate mixture of 1.3 g of sodium persulfate dissolved in 90 g of DI water over 60 min. Allow the temperature of the reaction mixture to increase to 92° C. Upon completion of the ME II and co-feed, hold the reaction mixture for 30 min at 85° C. Cool the batch to room temperature and filter to remove any coagulum formed. The final unneutralized latex will have a solids content of ~40.0%, an average particle size of ~380 nm, and a pH of ~2.2.

Example 35

Preparation of first polymer: Using the same equipment as in Example 1, 1200 g of DI water is added to the kettle and heated to 89° C. under a nitrogen atmosphere. 5.25 g of sodium persulfate dissolved in 30 g of DI water is added to the heated kettle. This is immediately followed by the addition of 314.5 g of core #3 (Ex. 13). Prepare monomer emulsion (ME I) by mixing 100 g of DI water, 6.7 g of SDS(23%), 100.0 g of styrene, 88.0 g of methyl methacrylate, and 12.0 g of methacrylic acid and add to the kettle over a period of 60 min at a temperature of 78° C. Upon completion of ME I, prepare a second monomer emulsion (ME II) by mixing 400 g of DI water, 18.0 g of SDS(23%), 1181.4 g of styrene, 18.0 g of methacrylic acid, 6.0 g of linseed oil fatty acid (LOFA) and 0.6 g of ALMA. Add monomer emulsion II (ME II) to the kettle along with a separate mixture of 1.3 g of sodium persulfate dissolved in 90 g of DI water over 60 min. Allow the temperature of the reaction mixture to increase to 92° C. Upon completion of the ME II and co-feed, hold the reaction mixture for 30 min at 85° C. Cool the batch to room temperature and filter to remove any coagulum formed. The final unneutralized latex will have a solids content of ~40.0%, an average particle size of ~380 nm, and a pH of ~2.2.

Example 36

Preparation of first polymer: Using the same equipment as in Example 1, 1200 g of DI water is added to the kettle and heated to 89° C. under a nitrogen atmosphere. 5.25 g of sodium persulfate dissolved in 30 g of DI water is added to the heated kettle. This is immediately followed by the addition of 314.5 g of core #3 (Ex. 13). Prepare monomer ME I by mixing 100 g of DI water, 6.7 g of SDS(23%), 100.0 g of styrene, 88.0 g of methyl methacrylate, and 12.0 g of methacrylic acid and add to the kettle over a period of 60 min at a temperature of 78° C. Upon completion of ME I, prepare a second monomer emulsion (ME 11) by mixing 400 g of DI water, 18.0 g of SDS(23%), 582.0 g of styrene, 18.0 g of methacrylic acid, 6.0 g of linseed oil fatty acid (LOFA) and 600.0 g of BGDMA. Add monomer emulsion II (ME II) to the kettle along with a separate mixture of 1.3 g of sodium persulfate dissolved in 90 g of DI water over 60 min. Allow the temperature of the reaction mixture to increase to 92° C. Upon completion of the ME II and co-feed, hold the reaction mixture for 30 min at 85° C. Cool the batch to room temperature and filter to remove any coagulum formed. The final unneutralized latex will have a solids content of ~40.0%, an average particle size of ~380 nm, and a pH of ~2.2.

Example 37

Formation of aqueous dispersion of polymeric particles: Using the same equipment as in Example 1, 1125 g of the first polymer of Example # 34 is added to the kettle and the temperature is adjusted to 25C. Prepare the ME by mixing 270 g of DI water, 15.0 g of SDS, 369 g of methyl methacrylate, 9.0 g of methacrylic acid, and 522 g of butyl acrylate. With the kettle temperature at 25° C., a solution of 20 g of 0.1% ferrous sulfate mixed with 2 g of 1% versene is added to the kettle. Next, co-feeds including a solution of 2.8 g of t-BHP mixed with 80 g of DI water, along with a separate solution of 2.0 g of iso-ascorbic acid mixed with 80 g of DI water are both added to the kettle at a rate of 0.5 g/min. 2 min after the start of the co-feed solutions, the ME prepared previously is added to the kettle at a rate of 5 g/min. Apply no external heat to the reaction. The temperature of the kettle is allowed to increase over the duration of the ME feed. After 45 min the ME feed rate is increased to 10 g/min. Upon completion of 90% of the ME feed, stop the ME and co-feeds and hold the reaction for 5 min. The temperature of the reaction at this point will be ~72° C. Next, add 900 g of hot DI water (90° C.) to the kettle. Resume the ME feed at a rate of 30 g/min until completion. Immediately after completion of the ME feed, add 32 g of ammonium hydroxide (28%) to the kettle. Hold the reaction for 5 min. Resume the co-feed solutions at a rate of 1.0 g/min until their completion. Cool the dispersion to 25° C. and filter to remove any coagulum. The filtered dispersion will have a solids content of ~38.0%, and an average particle size of ~450 nm. The S/Mil factor will be >0.1 and the collapse factor <0.5.

Example 38

Formation of aqueous dispersion of polymeric particles: An aqueous dispersion is prepared by following the procedure of Example 37, but substituting 1125 g of a first polymer made by Example 35. The filtered dispersion will have a solids content of ~38.0%, and an average particle size of ~450 nm. The S/Mil factor will be >0.1 and the collapse factor <0.5.

Example 39

Formation of aqueous dispersion of polymeric particles: An aqueous dispersion is prepared by following the procedure of Example 37, but substituting 1125 g of a first polymer made by Example 36. The filtered dispersion will have a solids content of ~38.0%, and an average particle size of ~450 nm. The S/Mil factor will be >0.1 and the collapse factor <0.5.

Example 40

Formation of aqueous dispersion of polymeric particles: Using the same equipment as in Example 1, 1125 g of the first polymer of Example 17 was added to the kettle and the temperature was adjusted to 25° C. A ME was prepared by mixing 270 g of DI water, 15.0 g of SDS, 369 g of methyl methacrylate, 9.0 g of methacrylic acid, and 522 g of butyl acrylate. With the kettle temperature at 25° C., a solution of 20 g of 0.1% ferrous sulfate mixed with 2 g of 1% versene was added to the kettle. Next, co-feeds including a solution of 2.8 g of t-BHP mixed with 80 g of DI water, along with a separate solution of 2.0 g of iso-ascorbic acid mixed with 80 g of DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min, the ME feed rate was increased to 10 g/min. Upon completion of 85% of the ME feed, the ME and co-feeds were stopped and the reaction was held for 5 min. The temperature of the reaction at this point was 72° C. Next, 600 g of hot DI water (90° C.) was added to the kettle. 2 g of an inhibitor, 4-hydroxy TEMPO, was added to the remaining ME and this mixture was fed to the kettle at a rate of 30 g/min until completion. Immediately after completion of the ME feed, 32 g of ammonium hydroxide (28%) mixed with 30 g of DI water was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 41.2%, and an average particle size of 485 nm. The BCOP hiding factor was 0.43 with a BCOP stability factor of 0.39. In this example, when 20% of the ME had been added to the kettle, an aliquot of the reaction mixture was withdrawn. Gas chromatographic analysis of this aliquot determined that the reaction mixture contained 1.6% unpolymerized monomer by weight, based on the weight of total reaction mixture when the aliquot was withdrawn.

Example 41

Formation of aqueous dispersion of polymeric particles: An aqueous dispersion was prepared following the recipe and procedure of Example 40, except that the first polymer was added to the kettle and adjusted to 40° C. The filtered dispersion had a solids content of 41.2%, and an average particle size of 495 nm. The BCOP hiding factor was 0.40 with a BCOP stability factor of 0.43.

Example 42

Formation of aqueous dispersion of polymeric particles: An aqueous dispersion was prepared following the recipe and procedure of Example 40, except that the first polymer was added to the kettle and adjusted to 50° C. The filtered dispersion had a solids content of 41.3%, and an average particle size of 498 nm. The BCOP hiding factor was 0.37 with a BCOP stability factor of 0.39.

Example 43

Formation of aqueous dispersion of polymeric particles: An aqueous dispersion was prepared following the recipe and procedure of Example 40 except that the first polymer was added to the kettle and adjusted to 60° C. The filtered dispersion had a solids content of 41.2%, and an average particle size of 505 nm. The BCOP hiding factor was 0.18 with a BCOP stability factor of 0.65.

Example 44

Formation of aqueous dispersion of polymeric particles: Using the same equipment as in Example 1, 1125 g of the first polymer of Example 17 was added to the kettle and the temperature was adjusted to 78° C. A ME was prepared by mixing 270 g of DI water, 15.0 g of SDS, 369 g of methyl methacrylate, 9.0 g of methacrylic acid, and 522 g of butyl acrylate. With the kettle temperature at 78° C., a solution of 3.0 g of sodium persulfate mixed with 30 g of DI water was added to the kettle. Next, the ME prepared previously was added to the kettle at a rate of 5 g/min and a solution of 1.0 g of sodium persulfate mixed with 60 g of DI water was added to the kettle at a rate of 0.5 g/min. The temperature of the kettle was allowed to increase to 83° C. over the duration of the ME feed. After 45 min, the ME feed rate was increased to 10 g/min. Upon completion of 85% of the ME feed and completion of the co-feed catalyst, the ME feed was stopped and the reaction was held for 5 min. A solution of 20 g of 0.1% ferrous sulfate mixed with 2 g of 1% versene was added to the kettle. The temperature of the reaction at this point was 83° C. Next, 600 g of hot DI water (90° C.) was added to the kettle. 2 g of an inhibitor, 4-hydroxy TEMPO, was added to the remaining ME and this mixture was fed to the kettle at a rate of 30 g/min until completion. Immediately after completion of the ME feed, 32 g of ammonium hydroxide (28%) mixed with 30 g of DI water was added to the kettle. The reaction was held for 5 min. Next, co-feeds including a solution of 2.0 g of t-BHP mixed with 50 g of DI water, along with a separate solution of 1.0 g of iso-ascorbic acid mixed with 50 g of DI water were both added to the kettle at a rate of 1.0 g/min until completion. The dispersion was then cooled to 25° C. and filtered to remove any coagulum. The filtered dispersion had a solids content of 41.4%, and an average particle size of 501 nm. The BCOP hiding factor was 0.05 with a BCOP stability factor of 0.60.

Example 45

Formation of aqueous dispersion of polymeric particles: Using the same equipment as in Example 1, 1125 g of the first polymer of Example 17 was added to the kettle and the temperature was adjusted to 25° C. A ME was prepared by mixing 270 g of DI water, 15.0 g of SDS, 189 grams of methyl methacrylate, 180.0 g of styrene, 9.0 g of methacrylic acid, and 522 g of butyl acrylate. With the kettle temperature at 25° C., a solution of 20 g of 0.1% ferrous sulfate mixed with 2 g of 1% versene was added to the kettle. Next, co-feeds including a solution of 2.8 g of t-BHP mixed with 80 g of DI water, along with a separate solution of 2.0 g of iso-ascorbic acid mixed with 80 g of DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 40 min the feed rate of the ME was increased to 10 g/min. Upon completion of 85% of the ME feed, the co-feeds were stopped and the reaction was held for 5 min. The temperature of the reaction at this point was 62° C. Next, 900 g of hot DI water (90° C.) was added to the kettle. The remaining portion of the ME was then added to the kettle a rate of 30 g/min followed by the addition of 32 g of ammonium hydroxide (28%). The reaction was held for 5 min. The co-feed solutions were then resumed at a rate of 1.0 g/min until their completion. The dispersion was then cooled to 25° C. and filtered to remove any coagulum. The filtered dispersion had a solids content of 38.1%, and an average particle size of 546 nm. The BCOP hiding factor was <0.1. In this example, when 20% of the ME had been added to the kettle, an aliquot of the reaction mixture was withdrawn. Gas chromatographic analysis of this aliquot determined that the reaction mixture contained 6.5% unpolymerized monomer by weight, based on the weight of total reaction mixture when the aliquot was withdrawn.

Example 46

Preparation of first polymer: Using the same equipment as in Example 1, DI water, 1200 g, was added to the kettle and heated to 89° C. under a nitrogen atmosphere. To the heated kettle water was added 5.25 g of sodium persulfate dissolved in 30 g of DI water. This was immediately followed by 314.5 g of core #3 (Ex. 13). A monomer emulsion (ME I) which was prepared by mixing 100 g of DI water, 6.7 g of SDS, 100.0 g of styrene, 88.0 g of methyl methacrylate, and 12.0 g of methacrylic acid was added to the kettle over a period of 60 min at a temperature of 78° C. Upon completion of ME I, a second monomer emulsion (ME II) was prepared by mixing 400 g of DI water, 18.0 g of SDS(23%), 1170 g of styrene, 18.0 g of methacrylic acid, 6.0 g of linseed oil fatty acid (LOFA), and 21.8 g of divinyl benzene (55% active). Monomer Emulsion II (ME II) was added to the kettle along with a separate mixture of 1.3 g of sodium persulfate dissolved in 90 g of DI water over 60 min. The temperature of the reaction mixture was allowed to increase to 92° C. Upon completion of the ME II and co-feed, the reaction mixture was held for 30 min at 85° C. and then cooled to room temperature and filtered to remove any coagulum formed. The final unneutralized latex had a solids content of 40.0%, an average particle size of 375 nm, and a pH of 2.2.

Example 47

Formation of aqueous dispersion of polymeric particles: Using the same equipment as in Example 1, 1125 g of the first polymer of Example 46 was added to the kettle and the temperature was adjusted to 25° C. A ME was prepared by mixing 270 g of DI water, 15.0 g of SDS, 369 g of methyl methacrylate, 9.0 g of methacrylic acid, and 522 g of butyl acrylate. With the kettle temperature at 25° C., a solution of 20 g of 0.1% ferrous sulfate mixed with 2 g of 1% versene was added to the kettle. Next, co-feeds including a solution of 2.8 g of t-BHP mixed with 80 g of DI water, along with a separate solution of 2.0 g of iso-ascorbic acid mixed with 80 g of DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 45 min, the ME feed rate was increased to 10 g/min. Upon completion of 85% of the ME feed, the ME and co-feeds were stopped and the reaction was held for 5 min. The temperature of the reaction at this point was 72° C. Next, 600 g of hot DI water (90° C.) was added to the kettle. 2 g of an inhibitor, 4-hydroxy TEMPO, was added to the remaining ME and this mixture was fed to the kettle at a rate of 30 g/min until completion. Immediately after completion of the ME feed, 32 g of ammonium hydroxide (28%) mixed with 30 g of DI water was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 41.2%, and an average particle size of 489 nm. The BCOP hiding factor was 0.54 with a BCOP stability factor of 0.06. In this example, when 20% of the ME had been added to the kettle, an aliquot of the reaction mixture was withdrawn. Gas chromatographic analysis of this aliquot determined that the reaction mixture contained 1.0% unpolymerized monomer by weight, based on the weight of total reaction mixture when the aliquot was withdrawn.

Example 48

Formation of aqueous dispersion of polymeric particles: An aqueous dispersion was prepared following the recipe and procedure of Example 47, except that the first polymer was added to the kettle and adjusted to 50° C. The filtered dispersion had a solids content of 41.3%, and an average particle size of 490 nm. The BCOP hiding factor was 0.53 with a BCOP stability factor of 0.11.

Example 49

Formation of aqueous dispersion of polymeric particles: An aqueous dispersion was prepared following the recipe and procedure of Example 47 except that the first polymer was added to the kettle and adjusted to 60° C. The filtered dispersion had a solids content of 41.4%, and an average particle size of 487 nm. The BCOP hiding factor was 0.55 with a BCOP stability factor of 0.13.

Example 50

Formation of aqueous dispersion of polymeric particles: An aqueous dispersion was prepared following the recipe and procedure of Example 44 above, except that 1125 g of the first polymer prepared in Ex. 46 was used. The filtered dispersion had a solids content of 41.5%, and an average particle size of 503 nm. The BCOP hiding factor was 0.51 with a BCOP stability factor of 0.34.

Example 51

Formation of aqueous dispersion of polymeric particles: Using the same equipment as in Example 1, 1125 g of the first polymer of Example 46 was added to the kettle and the temperature was adjusted to 25° C. A ME was prepared by mixing 270 g of DI water, 15.0 g of SDS, 189 grams of methyl methacrylate, 180.0 g of styrene, 9.0 g of methacrylic acid, and 522 g of butyl acrylate. With the kettle temperature at 25° C., a solution of 20 g of 0.1% ferrous sulfate mixed with 2 g of 1% versene was added to the kettle. Next, co-feeds including a solution of 2.8 g of t-BHP mixed with 80 g of DI water, along with a separate solution of 2.0 g of iso-ascorbic acid mixed with 80 g of DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the three hour ME feed. Upon completion of the ME feed, the co-feeds were stopped and the reaction was held for 5 min. The temperature of the reaction at this point was 61° C. Next, 600 g of hot DI water (90° C.) was added to the kettle. Then, 32 g of ammonium hydroxide (28%) was added to the kettle and the reaction was held for 5 min. The co-feed solutions were then resumed at a rate of 1.0 g/min until their completion. The dispersion was then cooled to 25° C. and filtered to remove any coagulum. The filtered dispersion had a solids content of 46.1%, and an average particle size of 495 nm. The BCOP hiding factor was 0.40 with a BCOP stability factor of 0.90. In this example, when 20% of the ME had been added to the kettle, an aliquot of the reaction mixture was withdrawn. Gas chromatographic analysis of this aliquot determined that the reaction mixture contained 6.3% unpolymerized monomer by weight, based on the weight of total reaction mixture when the aliquot was withdrawn.

Example 52

Formation of bimodal aqueous dispersion of polymeric particles: Using the same equipment as in Example 1, 1125 g of the first polymer of Example 46 was added to the kettle along with 125 g of another first polymer of Example 3 and the temperature was adjusted to 25° C. A ME was prepared by mixing 270 g of DI water, 15.0 g of SDS, 369 g of methyl methacrylate, 9.0 g of methacrylic acid, and 522 g of butyl acrylate. With the kettle temperature at 25° C., a solution of 20 g of 0.1% ferrous sulfate mixed with 2 g of 1% versene was added to the kettle. Next, co-feeds including a solution of 2.8 g of t-BHP mixed with 80 g of DI water, along with a separate solution of 2.0 g of iso-ascorbic acid mixed with 80 g of DI water were both added to the kettle at a rate of 0.5 g/min. 2 min after the start of the co-feed solutions, the ME prepared previously was added to the kettle at a rate of 5 g/min. There was no external heat applied to the reaction. The temperature of the kettle was allowed to increase over the duration of the ME feed. After 45 min, the ME feed rate was increased to 10 g/min. Upon completion of 85% of the ME feed, the ME and co-feeds were stopped and the reaction was held for 5 min. The temperature of the reaction at this point was 67° C. Next, 600 g of hot DI water (90° C.) was added to the kettle. 2 g of an inhibitor, 4-hydroxy TEMPO, was added to the remaining ME and this mixture was fed to the kettle at a rate of 30 g/min until completion. Immediately after completion of the ME feed, 32 g of ammonium hydroxide (28%) mixed with 30 g of DI water was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 41.0%. The dispersion was found to have 2 particle size modes. The large mode had a size of 471 nm while the small mode was found to be 99 nm with a weight ratio of 81% large/19% small. The BCOP hiding factor was 0.50 with a BCOP stability factor of 0.14.

Example 53

Formation of aqueous dispersion of polymeric particles: Using the same equipment as in Example 1, 1125 g of the first polymer of Example 46 is added to the kettle and the temperature adjusted to 25° C. A ME is prepared by mixing 270 g of DI water, 15.0 g of SDS, 171 g of 2-ethyl hexyl acrylate, 9.0 g of methacrylic acid, and 720 g of butyl acrylate. With the kettle temperature at 25° C., a solution of 20 g of 0.1% ferrous sulfate mixed with 2 g of 1% versene is added to the kettle. Next, co-feeds including a solution of 2.8 g of t-BHP mixed with 80 g of DI water, along with a separate solution of 2.0 g of iso-ascorbic acid mixed with 80 g of DI water are both added to the kettle at a rate of 0.5 g/min. 2 min after the start of the co-feed solutions, the ME prepared previously is added to the kettle at a rate of 5 g/min. There is no external heat applied to the reaction. The temperature of the kettle is allowed to increase over the duration of the ME feed. After 45 min, the ME feed rate is increased to 10 g/min. Upon completion of 85% of the ME feed, the ME and co-feeds are stopped and the reaction is held for 5 min. The temperature of the reaction at this point will be ~72° C. Next, 600 g of hot DI water (90° C.) is added to the kettle. 2 g of an inhibitor, 4-hydroxy TEMPO, is added to the remaining ME and this mixture is fed to the kettle at a rate of 30 g/min until completion. Immediately after completion of the ME feed, 32 g of ammonium hydroxide (28%) mixed with 30 g of DI water is added to the kettle. The reaction is held for 5 min. The co-feed solutions are then resumed at a rate of 1.0 g/min until their completion. The dispersion is then cooled to 25° C. and filtered to remove any coagulum. The filtered dispersion will have a solids content of ~41.0%, and an average particle size of ~485 nm. The BCOP hiding factor will be >0.1 with a BCOP stability factor of <0.50.

Example 54

Formation of aqueous dispersion of polymeric particles: An aqueous dispersion is prepared following the recipe and procedure of Example 53, except that the ME used is prepared by mixing 270 g of DI water, 15.0 g of SDS, 612 g of methyl methacrylate, 9.0 g of methacrylic acid, and 279 g of butyl acrylate. was used. The filtered dispersion will have a solids content of ~41.0%, and an average particle size of ~485 nm. The BCOP hiding factor will be >0.1 with a BCOP stability factor of <0.50.

Example 55

Formation of aqueous dispersion of polymeric particles: An aqueous dispersion is prepared following the recipe and procedure of Example 53, except that the ME used is prepared by mixing 270 g of DI water, 15.0 g of SDS, 675 grams of methyl methacrylate, 9.0 g of methacrylic acid, and 216 g of butyl acrylate. was used. The filtered dispersion will have a solids content of ~41.0%, and an average particle size of ~485 nm. The BCOP hiding factor will be >0.1 with a BCOP stability factor of <0.50.

TABLE 55.1

| % ME added to reactor | Ex. 40 | Ex. 41 | Ex. 42 | Ex. 43 | Ex. 44 | Ex. 45 | Ex. 47 | Ex. 48 | Ex. 49 | Ex. 50 | Ex. 51 |
|---|---|---|---|---|---|---|---|---|---|---|---|
| | | | | | Reaction Temperature | | | | | | |
| 0 | 25 | 40 | 50 | 60 | 78 | 25 | 25 | 50 | 60 | 78 | 25 |
| 10 | 37 | 47.5 | | | | | 37 | 56 | 64 | | |
| 20 | 44 | 53 | 59 | 64 | 83 | 40 | 45 | 60 | 66 | 83 | 39 |
| 30 | | | | | | | | | | | |
| 40 | | | | | 83 | 52 | | 69 | 72 | 83 | 52 |
| 50 | | | | | | 59 | | 72 | 72 | | 56 |
| 60 | | | | | | | | | | | |
| 70 | | | | | | 61 | | | | | 59 |
| 85 | 71 | 72 | 71 | 72 | 83 | 62 | 70 | 72 | 72 | 83 | |
| 90 | | | | | | | | | | | |
| 100 | | | | | | | | | | | 61 |

Example 56

Comparison of binders: Dry films resulting from two pigmented coating formulations, Formulation 1 and Formulation 2, are described. Formulation 1 uses particles of Example 47 as binder. Formulation 2 uses particles of Dispersion X as binder. The percentages expressed in this comparison and in Table 56.1 are % volume based on the combined volume of binder, pigment, and extender. $TiO_2$ and Ropaque™ Ultra are used as examples of pigments. $CaCO_3$, silica, and clay are used as examples of extenders. The dry film of Formulation 1 comprises 45% polymer particles of Example 47, 5% coatings grade rutile TiO2, and 50% CaCO3 having an average particle size of 5 microns. The dry film of Formulation 2 comprises, by volume, based on the total volume of binder, pigment and extender, 32% polymer particles of Dispersion X, 8% of the same TiO2 used in Formulation 1, and 60% of the same CaCO3 used in Formulation 1. Dispersion X is an aqueous dispersion of non-voided polymer particles having an average particle diameter of 489 nm formed by emulsion polymerization of a mixture of monomers consisting of, by weight, 41% methyl methacrylate, 58% butyl acrylate, and 1% methacrylic acid. The dried film of Formulation 1 displays opacity equal to, or greater than, the dried film of Formulation 2.

Table 56.1 similarly compares the opacity of dry films resulting from formulations using Example 47 and Dispersion X as binders at various levels of pigments and extenders.

TABLE 56.1

Opacity of Films From Formulations Using Inventive and Non-Inventive Polymers as Binders

| Binder Using Inventive Polymers (Formulation 1) | Binder Using Non-inventive Polymers (Formulation 2) |
|---|---|
| 68% Particles of Example 47, 5% $TiO_2$, 27% 5μ Clay | 57% Particles of Dispersion X, 8% $TiO_2$, 35% 5μ Clay |
| 79% Particles of Example 47, 8% $TiO_2$, 13% 5μ Clay | 61% Particles of Dispersion X, 12% $TiO_2$, 27% 5μ Clay |
| 69% Particles of Example 47, 6% $TiO_2$, 25% 2μ Silica | 38% Particles of Dispersion X, 12% $TiO_2$, 50% 2μ Silica |
| 51% Particles of Example 47, 9% $TiO_2$, 40% 5μ $CaCO_3$ | 40% Particles of Dispersion X, 15% $TiO_2$, 45% 5μ $CaCO_3$ |
| 78% Particles of Example 47, 7% $TiO_2$, 15% 5μ $CaCO_3$ | 40% Particles of Dispersion X, 15% $TiO_2$, 45% 5μ $CaCO_3$ |
| 79% Particles of Example 47, 8% $TiO_2$, 13% 5μ $CaCO_3$ | 42% Particles of Dispersion X, 18% $TiO_2$, 40% 5μ $CaCO_3$ |
| 84% Particles of Example 47, 10% $TiO_2$, 6% 2μ Silica | 62% Particles of Dispersion X, 18% $TiO_2$, 20% 2μ Silica |
| 87% Particles of Example 47, 11% $TiO_2$, 2% 5μ $CaCO_3$ | 58% Particles of Dispersion X, 22% $TiO_2$, 20% 5μ $CaCO_3$ |
| 79% Particles of Example 47, 13% $TiO_2$, 8% 5μ $CaCO_3$ | 68% Particles of Dispersion X, 22% $TiO_2$, 10% 5μ $CaCO_3$ |
| 73% Particles of Example 47, 12% $TiO_2$, 15% 5μ Clay | 72% Particles of Dispersion X, 18% $TiO_2$, 10% 5μ Clay |
| 89% Particles of Example 47, 11% $TiO_2$ | 82% Particles of Dispersion X, 18% $TiO_2$ |
| 70.5% Particles of Example 47, 14.5% $TiO_2$, 15% 5μ Clay | 61% Particles of Dispersion X, 25% $TiO_2$, 15% 5μ Clay |
| 87.5% Particles of Example 47, 12.5% $TiO_2$ | 76% Particles of Dispersion X, 18% $TiO_2$, 6% Ropaque™ Ultra |
| 76% Particles of Example 47, 9% $TiO_2$, 15% 8μ $CaCO_3$ | 35% Particles of Dispersion X, 15% $TiO_2$, 40% 8μ $CaCO_3$, 10% Ropaque™ Ultra |
| 72% Particles of Example 47, 8% $TiO_2$, 15% 5μ $CaCO_3$, 5% Ropaque™ Ultra | 35% Particles of Dispersion X, 15% $TiO_2$, 40% 5μ $CaCO_3$, 10% Ropaque™ Ultra |

Dry films resulting from coating formulations, such as those described for Formulation 1, Formulation 2, and in Table 56.1 will typically also comprise from 0.5 to 20% by volume, based on the total volume of the dry film, dispersants, coalescents, solvents, defoamers, thickeners, wetting agents, surfactants, waxes, biocides, colored pigments, and other adjuvants commonly found in coatings. The inventive dispersions may also be used in formulations with non-voided binder polymers to achieve varying balances of opacity and binding characteristics.

What is claimed is:

1. An aqueous dispersion comprising polymeric particles, the particles comprising: core stage polymer comprising, as polymerized units, from 5 to 100% by weight, based on the weight of the core, of at least one hydrophilic mono-ethylenically unsaturated monomer and from 0 to 95% by weight of at least one nonionic mono-ethylenically unsaturated monomer;

from 33% to 58% by weight, based on total polymeric weight of the particles when dry, of a first shell stage polymer having a Tg of 50° C. or greater, the first shell stage polymer comprising when dry, at least one void, the void having a diameter of from 100 to 1200 nanometers, wherein the first shell stage polymer is formed by a polymerization of at least one mono-ethylenically unsaturated monomer and from 0.05 to 50% by weight, based on the total weight of the first shell stage polymer, of at least one multi-ethylenically unsaturated monomer; and from 38% to 67% by weight, based on the weight of the polymeric particles, of at least one second shell stage polymer comprising, as polymerized units, at least one ethylenically unsaturated monomer, the second shell stage polymer substantially encapsulating the first shell stage polymer and having a Tg of from −60° C. to 50° C., wherein the second shell stage polymer is formed by a polymerization of at least one mono-ethylenically unsaturated monomer in the presence of the first shell stage polymer, and further wherein at least 10% of the second shell stage polymer is formed by polymerization at a temperature of from 5° C. to 65° C., the temperature being at least 30° C. below the calculated Tg of the first polymer; wherein the at least one hydrophilic mono-ethylenically unsaturated monomer of the core stage polymer is selected from the group consisting of methacrylic acid, and the at least one non-ionic mono-ethylenically unsaturated monomer of the core stage polymer is selected from the group consisting of methyl methacrylate; the at least one mono-ethylenically unsaturated monomer of the first shell polymer is selected from the group consisting of methyl methacrylate, methacrylic acid, butyl acrylate, styrene and mixtures thereof; and the at least one mono-ethylenically unsaturated monomer of the second shell polymer is selected from the group consisting of methyl methacrylate, methacrylic acid, 2-ethylhexyl acrylate, butyl acrylate, styrene and mixtures thereof; wherein the first shell stage polymer comprises at least two polymers formed in at least two stages wherein the aqueous dispersion has a BCOP biding factor of at least 0.1.

2. The aqueous dispersion of claim 1 wherein the dispersion comprises a BCOP stability factor of less than 0.5.

3. The aqueous dispersion of claim 1 wherein at any time (T) during the polymerization of a first 20% of the second shell stage polymer, no more than 6% unpolymerized monomer by weight, based on a weight of total reaction mixture at time (T) present in a reaction vessel.

4. The aqueous dispersion of claim 1 further comprising from 5% to 95% by weight, based on a total polymeric content of the dispersion of unvoided particles comprising a polymer having a Tg of from −55° C. to 50° C.

5. An aqueous coating composition comprising particles according to claim 1 having a Pigment Volume Concentration of from 0 to 95.

6. A process for forming an aqueous dispersion of polymeric particles having a BCOP hiding factor of at least 0.1, comprising:

providing an aqueous dispersion of multi-stage emulsion polymer, the multi-stage emulsion polymer comprising a core stage polymer, the core stage polymer comprising, as polymerized units, from 5 to 100% by weight, based on a weight of the core stage polymer, of at least one hydrophilic mono-ethylenically unsaturated monomer, and from 0 to 95% by weight, based on the weight of the core stage polymer, of at least one nonionic mono-ethylenically unsaturated monomer, from 33% to 58% by weight, based on total polymeric weight of the particles when dry, of a first shell stage polymer, the first shell stage polymer having a calculated Tg of at least 50° C., comprising when dry, at least one void, the void having a diameter of from 100 to 1200 nanometers, and the first shell stage polymer formed by a polymerization of at least one mono-ethylenically unsaturated monomer and from 0.05 to 50% by weight, based on the total weight of the first shell stage polymer, of at least one multi-ethylenically unsaturated monomer;

forming from 38% to 67% by weight, based on total weight of the polymeric particles when dry, of at least one second shell stage polymer comprising, as polymerized units, at least one ethylenically unsaturated monomer, the second shell stage polymer substantially encapsulating the first shell stage polymer and having a Tg of from −60 ° C. to 50° C., wherein the second shell stage polymer is formed by a polymerization of at least one mono-ethylenically unsaturated monomer in the presence of the first shell stage polymer, and further wherein at least 10% of the second shell stage polymer is formed by polymerization at a temperature of from 5° C. to 65° C., the temperature being at least 30° C. lower than the calculated Tg of the first shell stage polymer; and wherein the at least one hydrophilic mono-ethylenically unsaturated monomer of the core stage polymer is selected from the group consisting of methacrylic acid, and the at least one non-ionic mono-ethylenically unsaturated monomer of the core stage polymer is selected from the group consisting of methyl methacrylate; the at least one mono-ethylenically unsaturated monomer of the first shell polymer is selected from the group consisting of methyl methacrylate, methacrylic acid, butyl acrylate, styrene and mixtures thereof; and the at least one mono-ethylenically unsaturated monomer of the second shell polymer is selected from the group consisting of methyl methacrylate, methacrylic acid, 2-ethylhexyl acrylate, butyl acrylate, styrene and mixtures thereof; wherein the first shell stage polymer comprises at least two polymers formed in at least two stages adding a swelling agent to the aqueous dispersion prior to, during, or after the polymerization of the mono-ethylenically unsaturated monomers of the second shell stage polymer.

7. The process of claim 6 wherein the swelling agent is added to the dispersion at a time when the dispersion comprises at least 0.5% by weight, based on a total polymeric content of polymer in the dispersion, unpolymerized monomer under conditions wherein no substantial polymerization of the monomer occurs; and subsequently reducing a level of monomer by at least 50%.

8. The aqueous dispersion of claim 1, having a dry density of 1.0194 g/cc or less.

9. The aqueous dispersion of claim 1, wherein the second shell stage polymer comprises from 0.1 to 2.5% by weight, based on the weight of the second shell stage polymer, of at least one mono-ethylenically-unsaturated acid monomer, and optionally, a mono-ethylenically-unsaturated amide monomer.

10. The aqueous dispersion of claim 9, wherein the mono-ethylenically-unsaturated acid monomer is methacrylic acid.

11. The aqueous dispersion of claim 9; wherein the second shell stage polymer comprises at least two polymers formed in two stages; wherein the at least two polymers formed in two stages have a Tg of from −60° C. to 50° C.; and further wherein at least 10% of the at least two polymers formed in two stages is formed by polymerization at a temperature of from 5° C. to 65° C., the temperature being at least 30° C. below the calculated Tg of the first polymer.

* * * * *